(12) United States Patent
Saxton et al.

(10) Patent No.: US 7,546,808 B2
(45) Date of Patent: Jun. 16, 2009

(54) RAILROAD CAR WITH LIGHTWEIGHT CENTER BEAM STRUCTURE

(75) Inventors: Gregory J. Saxton, Portland, OR (US); Robert W. Johnson, Westville (CA)

(73) Assignee: Gunderson, Inc., Portland, OR (US)

( * ) Notice: Subject to any disclaimer, the term of this patent is extended or adjusted under 35 U.S.C. 154(b) by 251 days.

(21) Appl. No.: 11/473,597

(22) Filed: Jun. 22, 2006

(65) Prior Publication Data

US 2007/0295239 A1    Dec. 27, 2007

(51) Int. Cl.
*B61D 17/00* (2006.01)
*B61D 3/00* (2006.01)

(52) U.S. Cl. .................. 105/355; 105/411; 105/416; 105/404

(58) Field of Classification Search .............. 105/355, 105/404, 396, 407, 411, 416, 418
See application file for complete search history.

(56) References Cited

U.S. PATENT DOCUMENTS

| | | | |
|---|---|---|---|
| 2,839,328 A | 6/1958 | Prickett et al. |
| 2,940,402 A | 6/1960 | Hansen et al. |
| 2,996,030 A | 8/1961 | Udstad |
| 3,081,716 A | 3/1963 | Szczepanik |
| 3,159,112 A | 12/1964 | Tomlinson |
| 3,230,900 A | 1/1966 | Ruprecht et al. |
| 3,244,120 A | 4/1966 | Taylor |
| 3,485,184 A | 12/1969 | Berry |
| 3,675,592 A | 7/1972 | Bateson et al. |
| 3,677,193 A | 7/1972 | Pringle |
| 3,690,272 A | 9/1972 | Ogle et al. |
| 3,713,400 A | 1/1973 | Teoli |
| 3,734,031 A | 5/1973 | Wagner |
| 3,774,554 A | 11/1973 | O'Neill et al. |
| 3,814,028 A | 6/1974 | Adler |
| 3,964,399 A | 6/1976 | Miller et al. |
| 4,024,821 A | 5/1977 | Yang |
| 4,079,676 A | 3/1978 | Miller |
| 4,082,045 A | 4/1978 | McNally et al. |
| RE30,388 E | 9/1980 | Mundinger et al. |
| 4,236,459 A | 12/1980 | Teoli |
| 4,331,083 A | 5/1982 | Landregan et al. |
| 4,373,447 A | 2/1983 | Pfister |
| 4,543,887 A | 10/1985 | Baker |
| 4,626,017 A | 12/1986 | Robertson |
| 4,681,041 A | 7/1987 | Harris et al. |

(Continued)

OTHER PUBLICATIONS

Atlantic & Western center partition car No. ATW 50073, at least as early as May 2004 (two color photographs).

(Continued)

*Primary Examiner*—S. Joseph Morano
*Assistant Examiner*—Jason C Smith
(74) *Attorney, Agent, or Firm*—Chernoff, Vilhauer, McClung & Stenzel, LLP

(57) ABSTRACT

A railroad freight car of the center beam type, in which the upright center beam has a top chord interconnected with a bulkhead at each end of the body of the car, and spaced-apart upright columns and elongate diagonal structural members interconnect the top chord with the center sill of the car body. A top chord may be of formed plate including longitudinal stiffening ridges and laterally outer reinforcing parts.

23 Claims, 18 Drawing Sheets

U.S. PATENT DOCUMENTS

| | | |
|---|---|---|
| 4,690,072 A | 9/1987 | Wile et al. |
| 4,753,175 A | 6/1988 | Harris et al. |
| 4,784,067 A | 11/1988 | Harris et al. |
| 4,802,420 A * | 2/1989 | Butcher et al. ............... 105/355 |
| 4,951,575 A | 8/1990 | Dominguez et al. |
| 5,024,567 A | 6/1991 | Dominguez et al. |
| 5,088,417 A * | 2/1992 | Richmond et al. .......... 105/411 |
| 5,271,336 A | 12/1993 | Willetts |
| 5,582,495 A * | 12/1996 | Schroeder .................... 410/32 |
| 5,626,083 A * | 5/1997 | Saxton ....................... 105/355 |
| 5,758,584 A * | 6/1998 | Saxton ....................... 105/355 |
| 6,199,486 B1 | 3/2001 | Landrum et al. |
| 6,237,506 B1 | 5/2001 | Forbes |
| 6,390,272 B1 * | 5/2002 | Tsutsui .................... 198/343.1 |
| 6,431,085 B1 * | 8/2002 | Saxton et al. ................ 105/355 |
| 6,470,808 B1 * | 10/2002 | Clark et al. .................. 105/404 |
| 6,523,484 B2 * | 2/2003 | Saxton et al. ............... 105/404 |
| 2002/0073890 A1 * | 6/2002 | Saxton et al. ............... 105/404 |
| 2003/0015118 A1 * | 1/2003 | Saxton et al. ............... 105/355 |
| 2004/0094063 A1 * | 5/2004 | Saxton et al. ............... 105/404 |
| 2005/0166789 A1 * | 8/2005 | Saxton et al. ............... 105/355 |
| 2006/0254457 A1 * | 11/2006 | Forbes ........................ 105/355 |
| 2007/0295239 A1 * | 12/2007 | Saxton et al. ............... 105/355 |

OTHER PUBLICATIONS

Central Pacific center partition car No. CP 319126, three photographs, car built Nov. 1999.

* cited by examiner

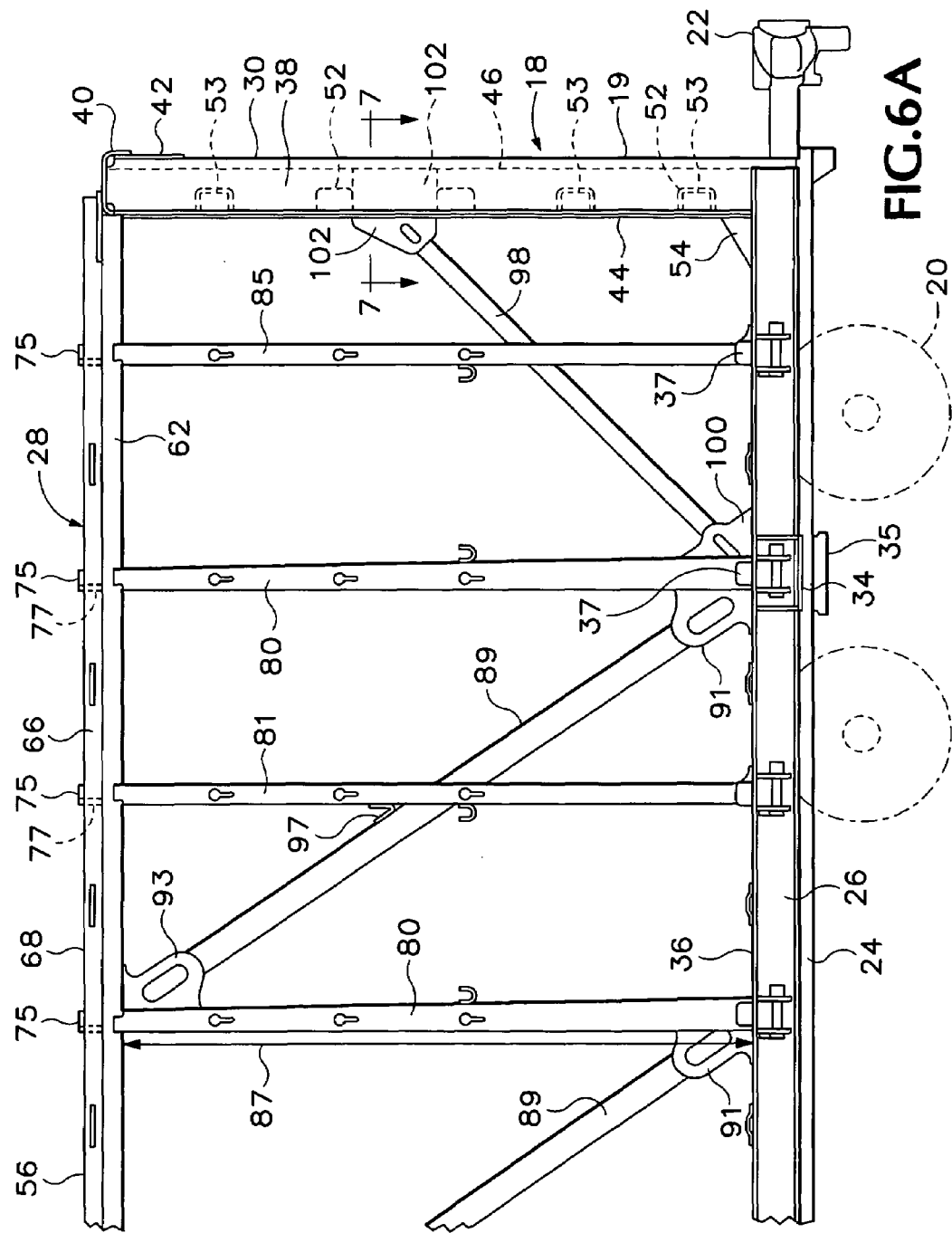

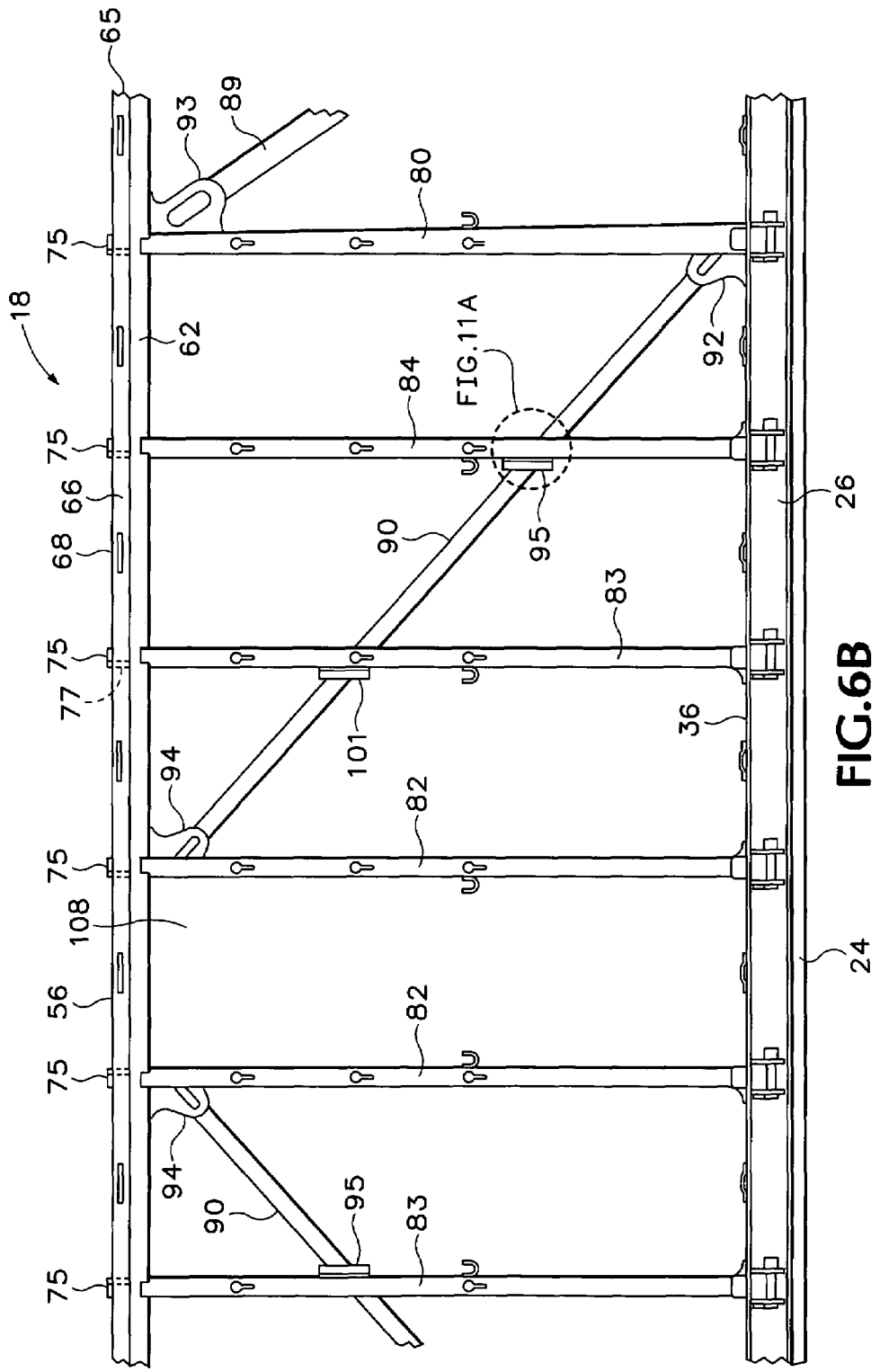

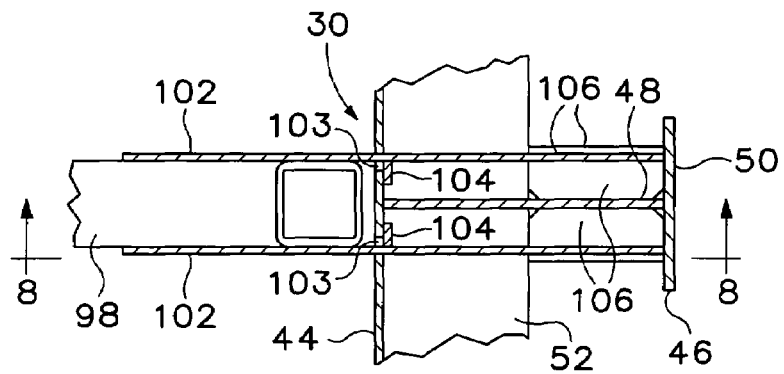
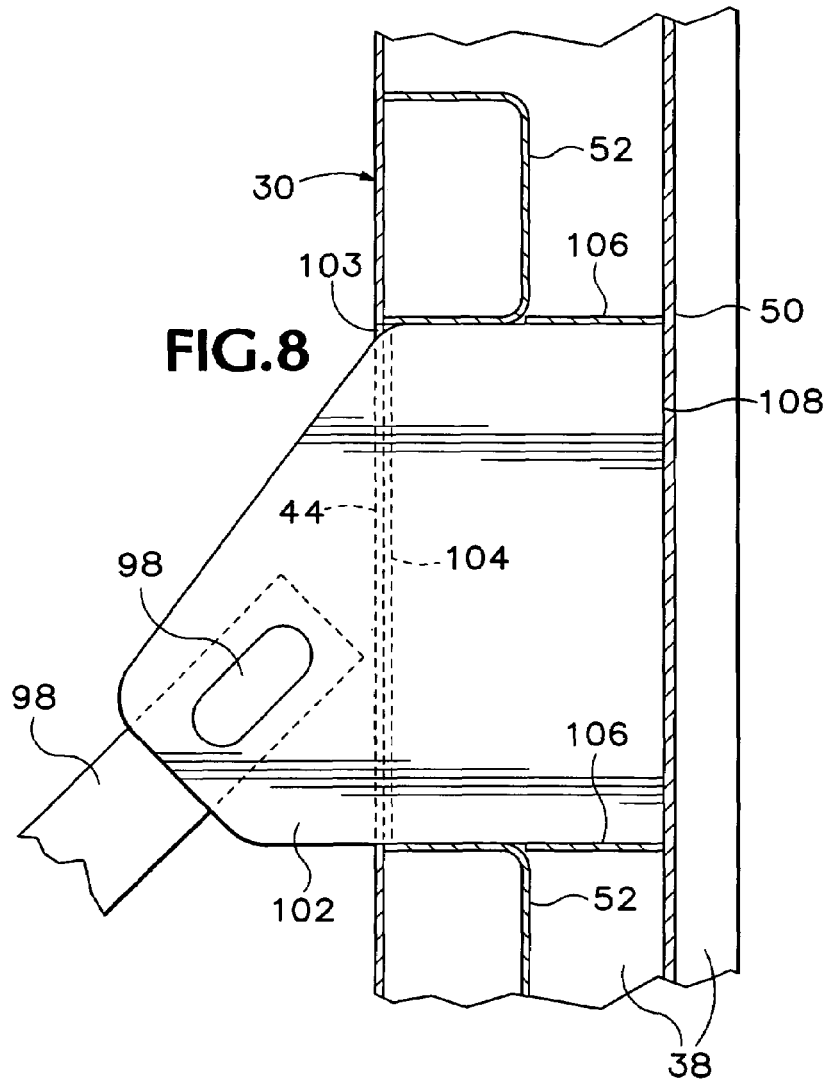

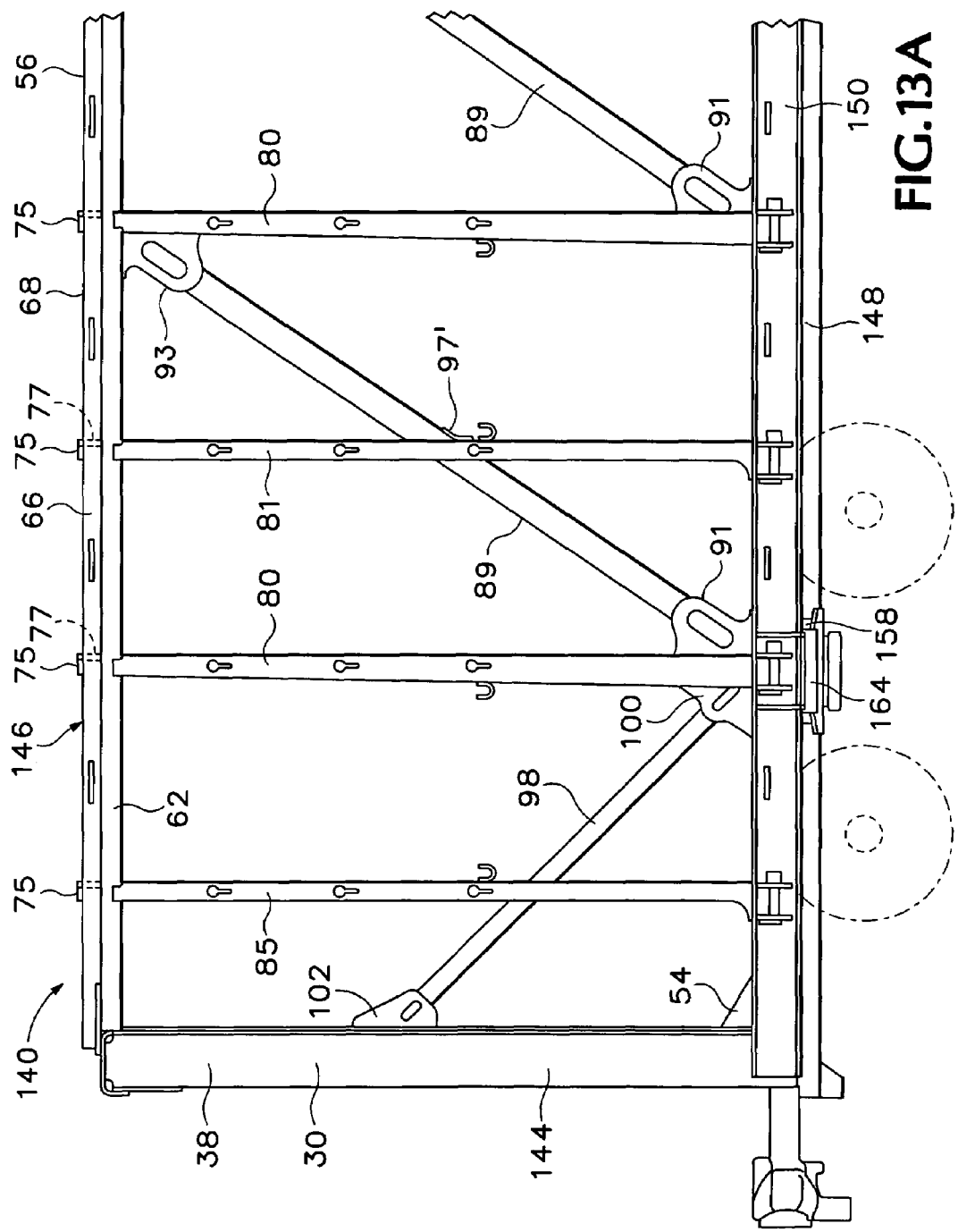

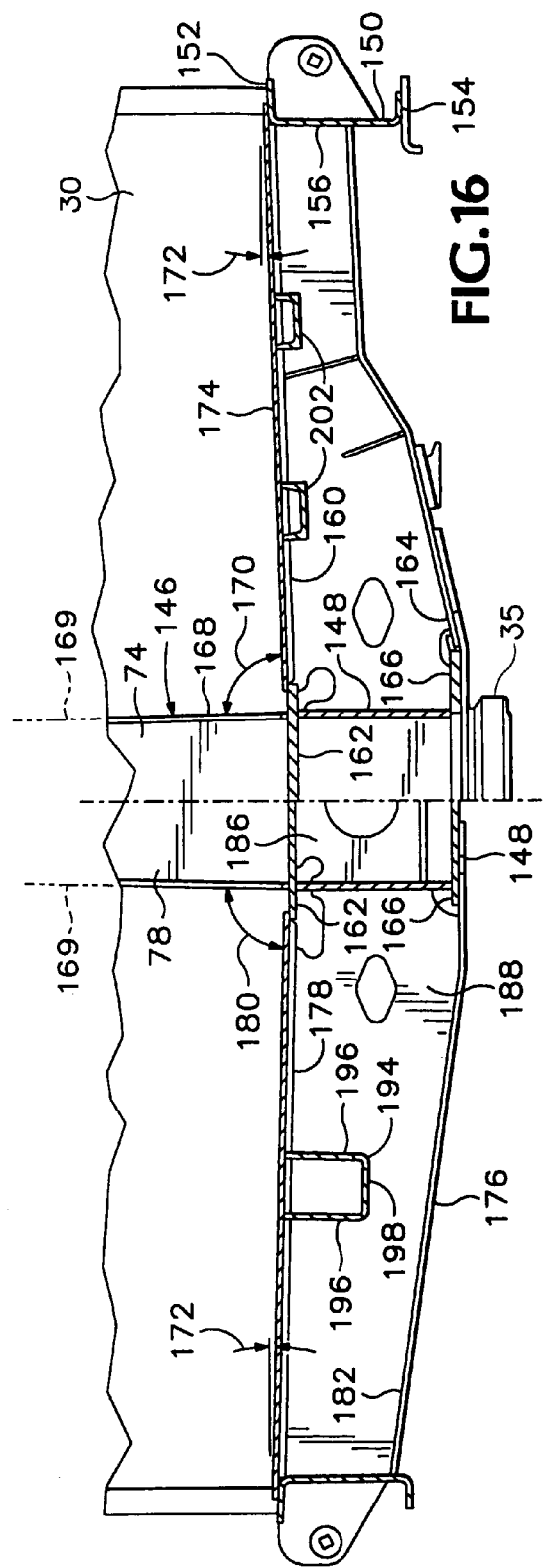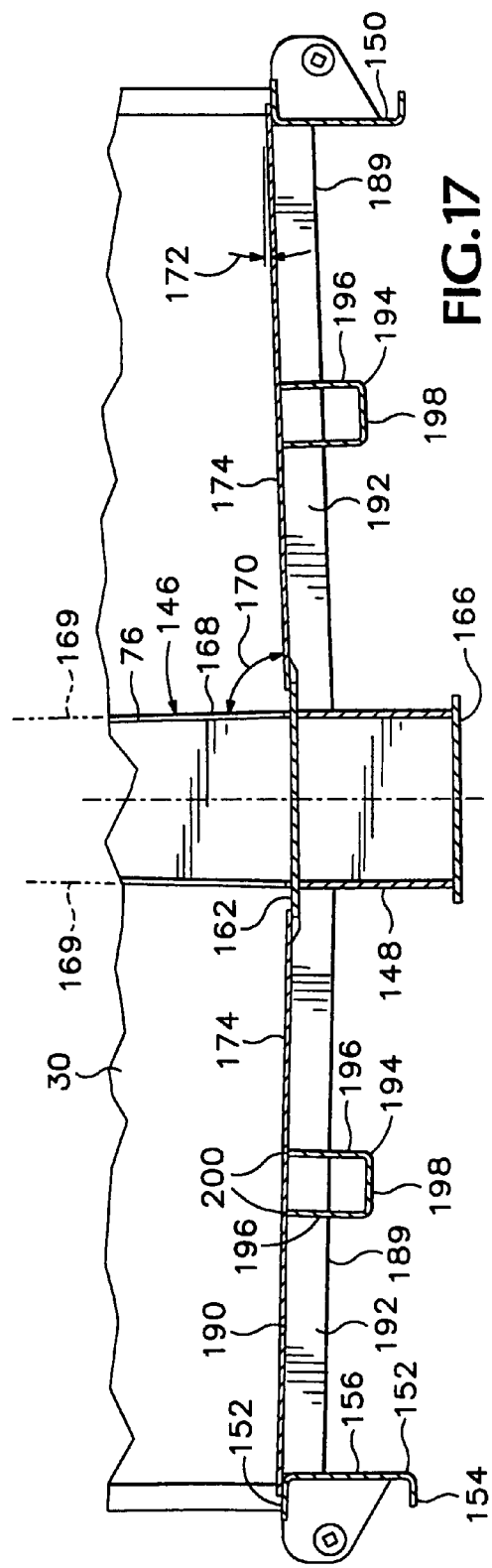

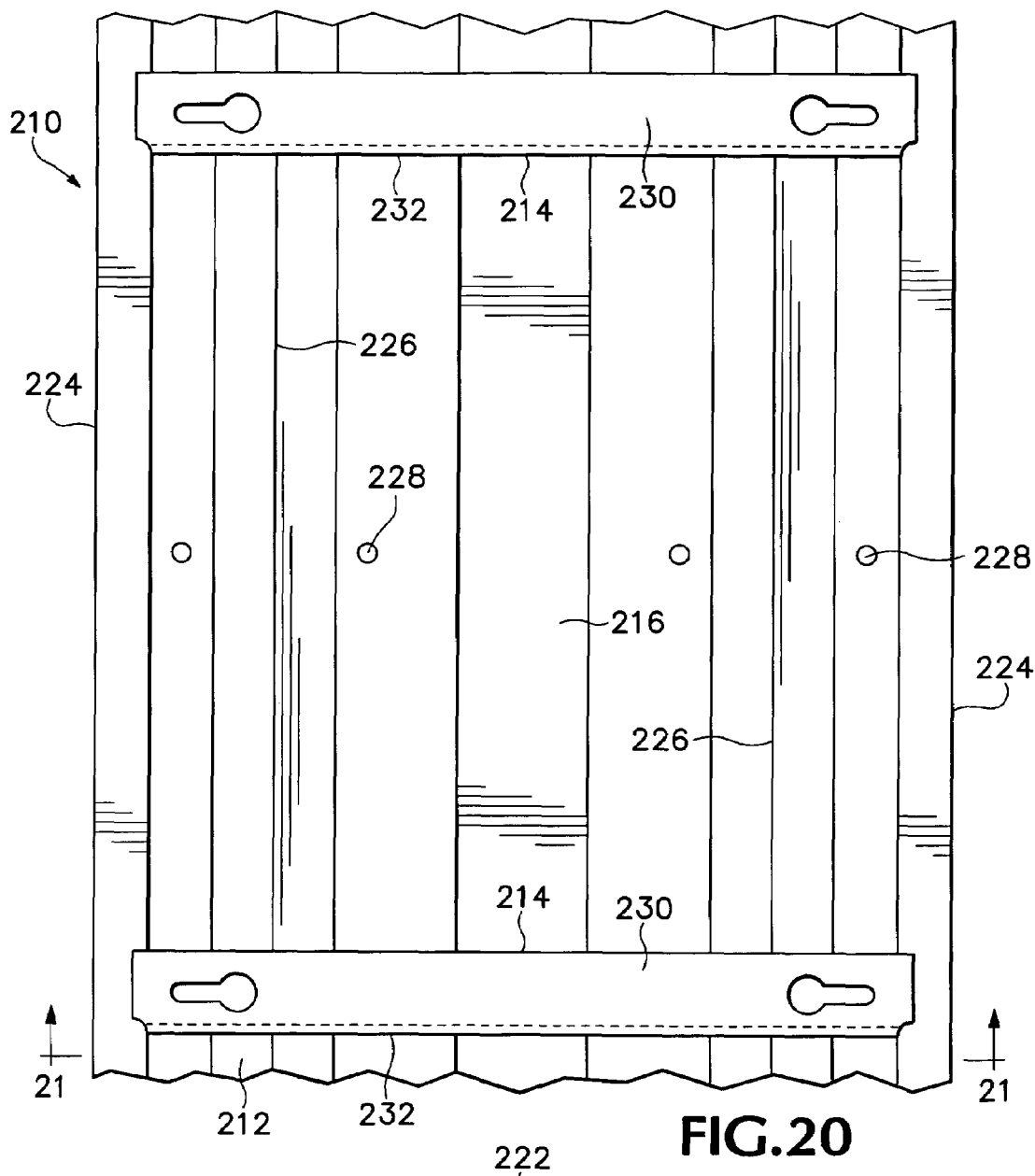
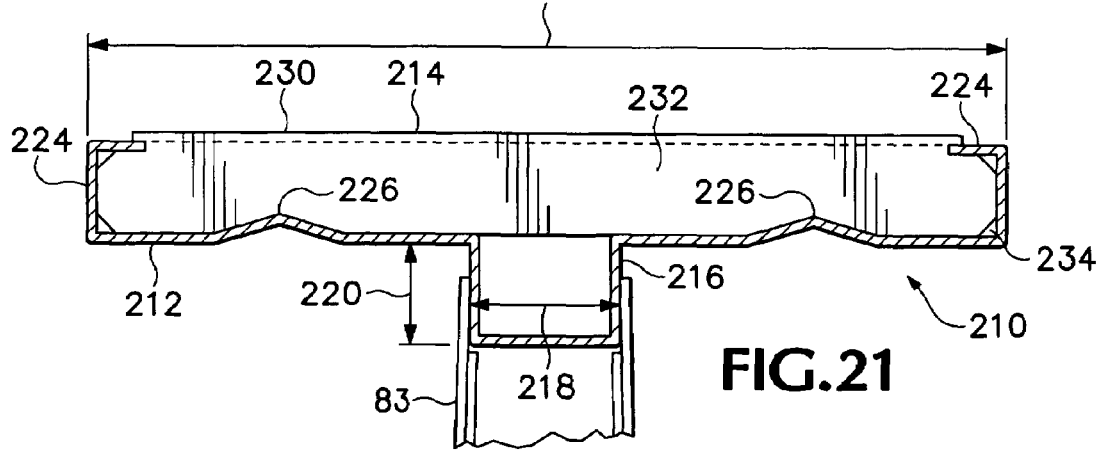

RAILROAD CAR WITH LIGHTWEIGHT CENTER BEAM STRUCTURE

BACKGROUND OF THE INVENTION

The present disclosure relates to railroad freight cars and in particular to cars of the type incorporating a tall center beam structure extending along the length of the car body between a pair of bulkheads located at the ends of the car body.

Center beam railroad cars, also called center partition bulkhead flat cars, have been used for more than three decades to carry materials such as lumber and sheets of building materials that can be contained in packages of uniform size and shape. Such center beam cars have repeatedly been redesigned in attempting to reduce tare weight yet provide ample strength to resist dead weight forces of lading as well as the dynamic forces produced by movement of such a car as a part of a train. Lighter weight in such cars advantageously allows carriage of additional revenue-bearing cargo while the laden car remains within limits on the maximum loading which can be imposed on the rails. Additionally, a lighter car requires less fuel when being moved unladen.

A shorter overhanging portion of a freight car, the portion longitudinally outboard of the supporting center bearing, reduces the likelihood of derailment caused by compression or tension forces between adjacent cars of a train.

Various stages of development of such center beam cars are represented in prior art patents such as Wagner U.S. Pat. No. 3,734,031, Baker U.S. Pat. No. 4,543,887, Harris et al. U.S. Pat. No. 4,681,041, Butcher et al. U.S. Pat. No. 4,802,420, Saxton U.S. Pat. No. 5,758,584, and Clark, et al. U.S. Pat. Nos. 6,470,808 and 6,550,398. The cars disclosed in these patents all include bulkheads at the opposite ends of a car body and an upright longitudinally-oriented center beam including the center sill of the car body, a top chord interconnecting the tops of the bulkheads, and a vertical structure interconnecting the center sill with the top chord along the length of the car body.

What is desired, then, is an improved center beam car of lighter weight than previously has been thought practical, yet which has ample strength to withstand the forces imposed by greater weights of lading than could be carried safely by previously-known cars. Desirably, such a car would also have a short longitudinal overhang.

SUMMARY OF THE DISCLOSURE

A center beam car is constructed to have ample strength in a car body having a lighter weight than was previously thought possible, as defined by the claims appended hereto.

A center beam car embodying one aspect of the present disclosure includes a center sill extending the length of the body, a top chord extending parallel with and spaced upwardly apart from the center sill, upright columns interconnecting the center sill and the top chord, and at least two elongate diagonal structural brace members each having a first end interconnected with the center sill and a second end interconnected with the top chord at a location spaced apart from the first end longitudinally of the car body by a distance more than twice the column spacing distance between successive ones of the columns.

According to another aspect of the disclosure, a center beam car may include a lightweight top chord constructed of formed metal plate.

In one embodiment of one aspect of the car disclosed herein the ends of each diagonal brace member may be attached to the bulkhead, top chord, or center sill by being welded in place between a respective pair of attachment plates.

According to another aspect of the car disclosed herein diagonal bracing members of the center beam may be located so that wheeled trucks supporting the body of the car are separated by a greater distance and longitudinal overhang at an end of the car is reduced.

The foregoing and other features and advantages of the car disclosed herein will be more readily understood upon consideration of the following detailed description of the invention taken in conjunction with the accompanying drawings.

BRIEF DESCRIPTION OF THE SEVERAL DRAWINGS

FIG. 6A is a side elevational view of an end portion of the railroad car shown in FIG. 1.

FIG. 6B is a side elevational view of a middle portion of the railroad car shown in FIG. 1.

FIG. 7 is a sectional view of a detail of the railroad car shown in FIG. 1, taken along line 7-7 of FIG. 6A.

FIG. 8 is a sectional detail view of a portion of the railroad car shown in FIG. 1, taken along line 8-8 of FIG. 7.

FIG. 13A is a side elevational view of a portion including one end of a railroad car which is a further alternative embodiment of the disclosed railroad car, shown without a wheeled truck, but with the location of the wheels shown in broken line.

FIG. 16 is a section view taken along line 16-16 in FIG. 14, showing the underframe structure of the car shown in FIGS. 13A, 14, and 15.

FIG. 17 is a section view taken along line 17-17 in FIG. 14 showing a transversely extending crosstie that is a part of the underframe structure of the car shown in FIGS. 13-16.

FIG. 20 is a top plan view of a portion of a top chord of an alternative construction, for incorporation in a railroad car of the general type shown in FIGS. 1-19.

FIG. 21 is a partially cutaway sectional view, taken along line 21-21 of FIG. 20.

DETAILED DESCRIPTION OF PREFERRED EMBODIMENTS

Figure 1:
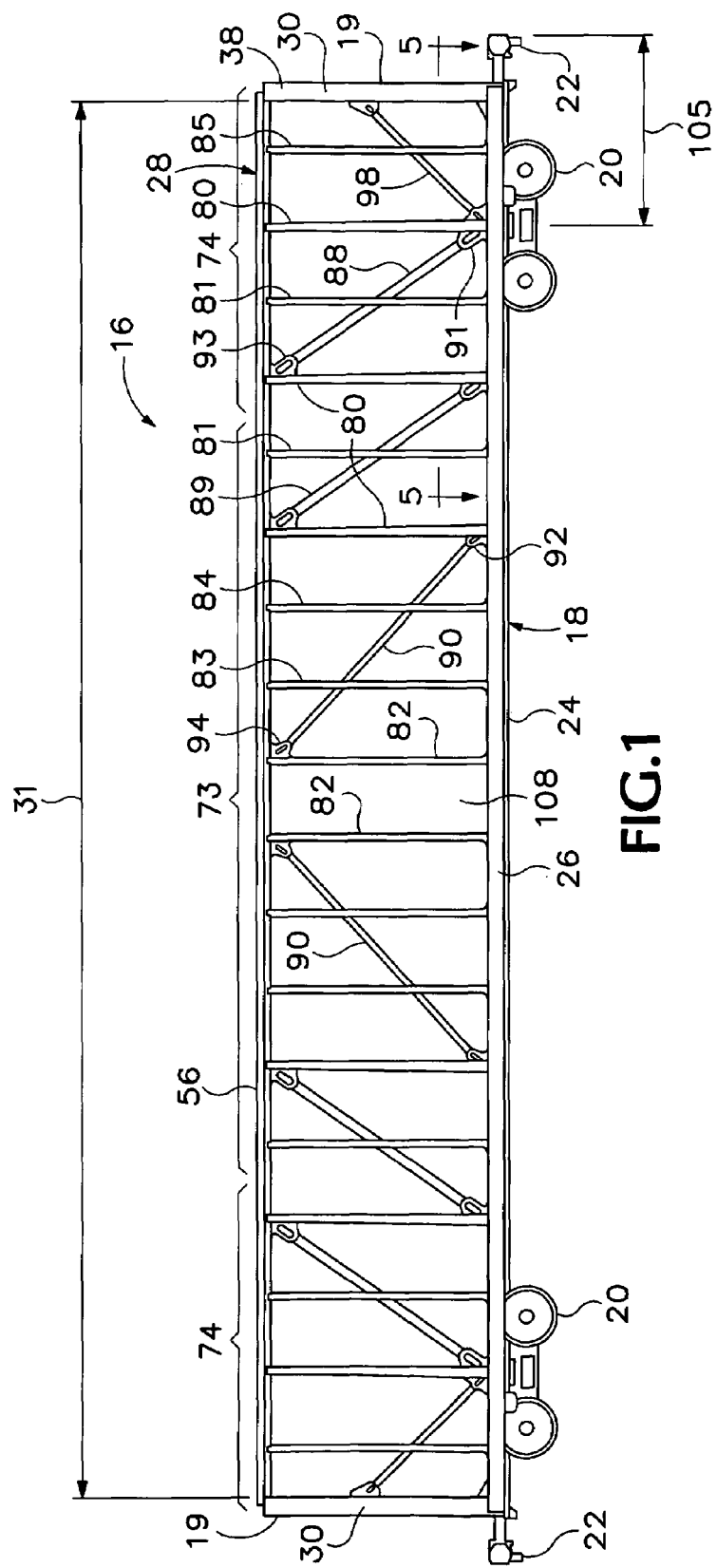
FIG. 1 is a side elevational view of an exemplary railroad car including a lightweight center beam structure.
Figure 2:
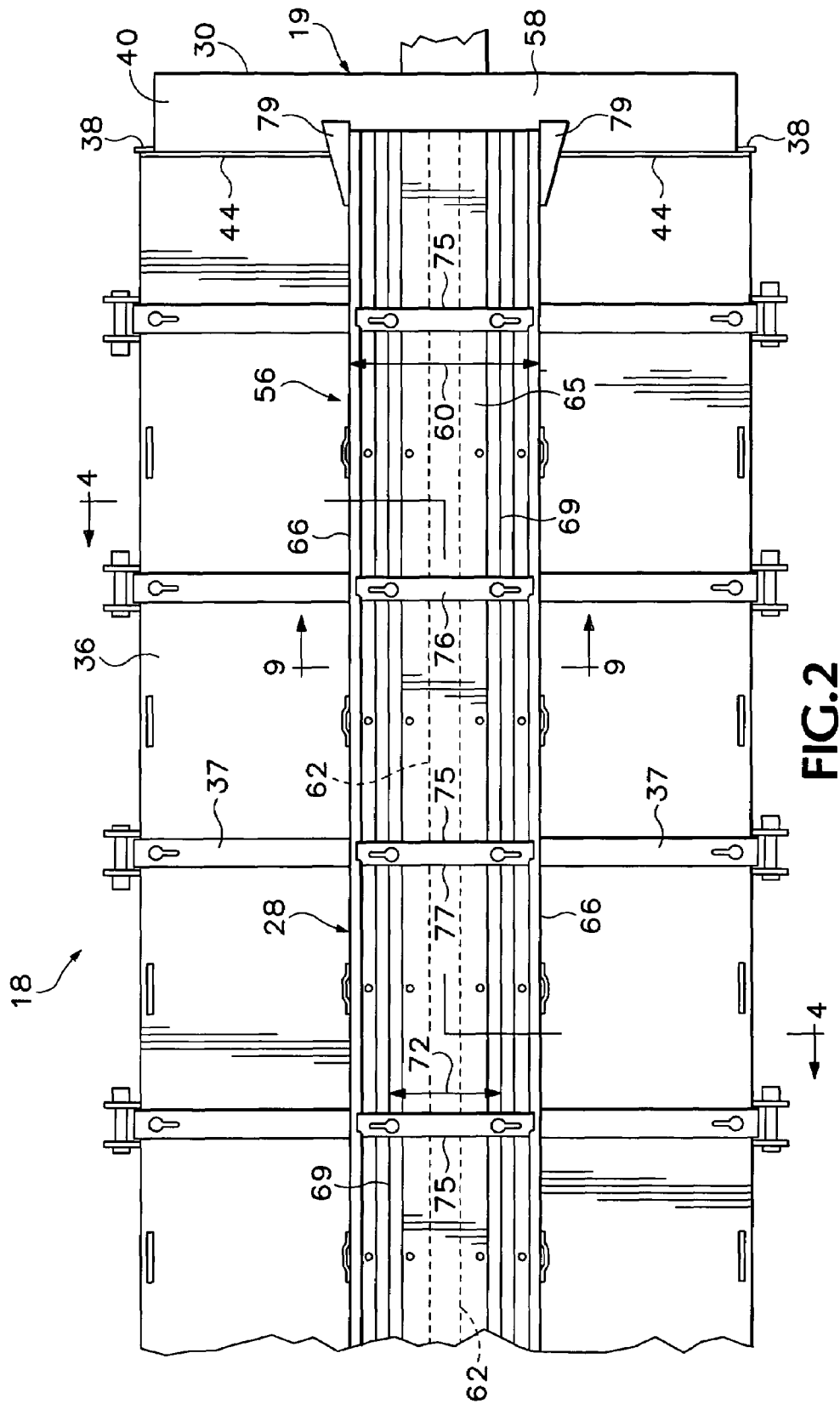
FIG. 2 is a somewhat simplified top plan view of a portion of the railroad car shown in FIG. 1, at an enlarged scale.
Figure 3:
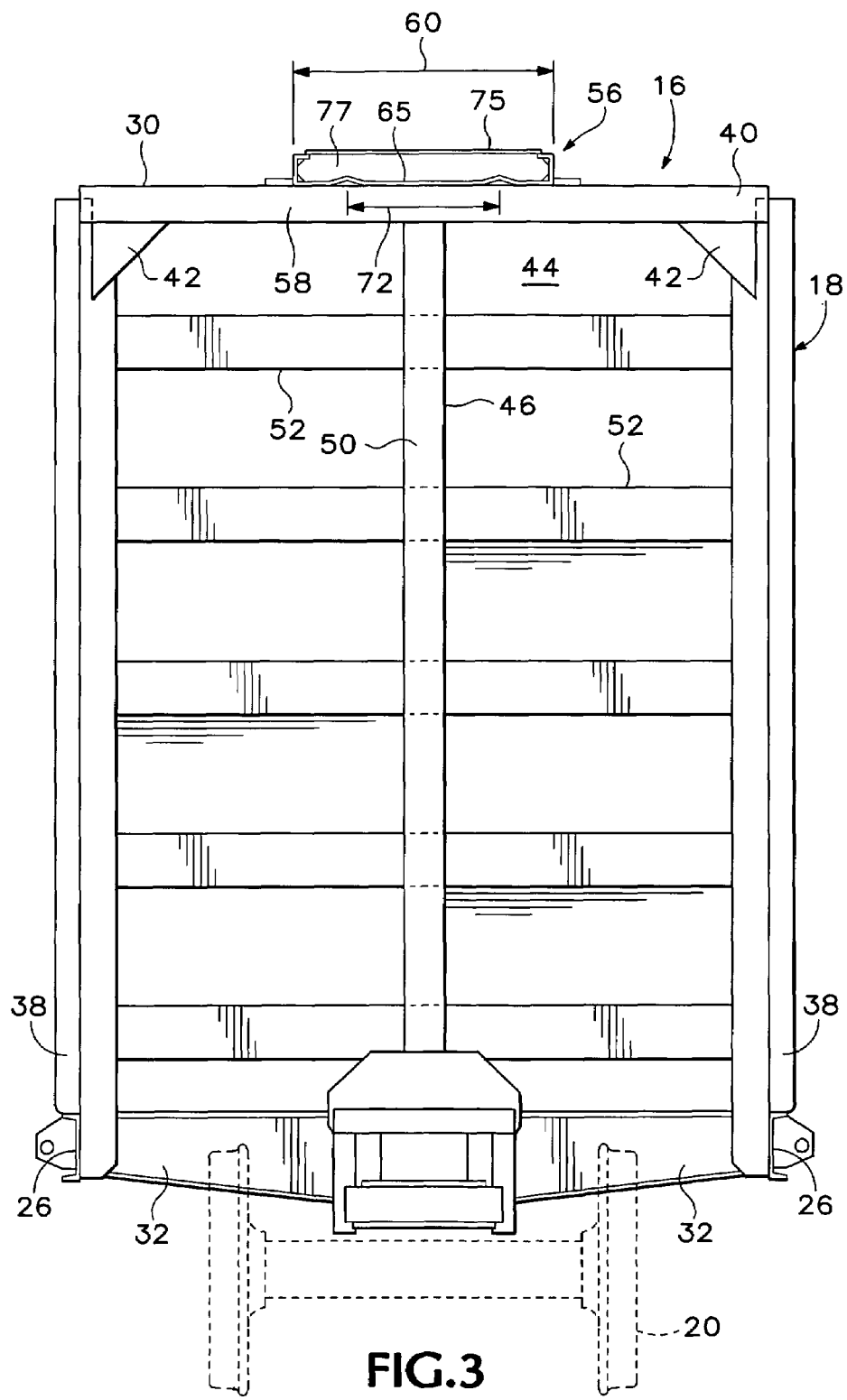
FIG. 3 is a somewhat simplified end elevational view of the railroad car shown in FIG. 1.
Figure 4:
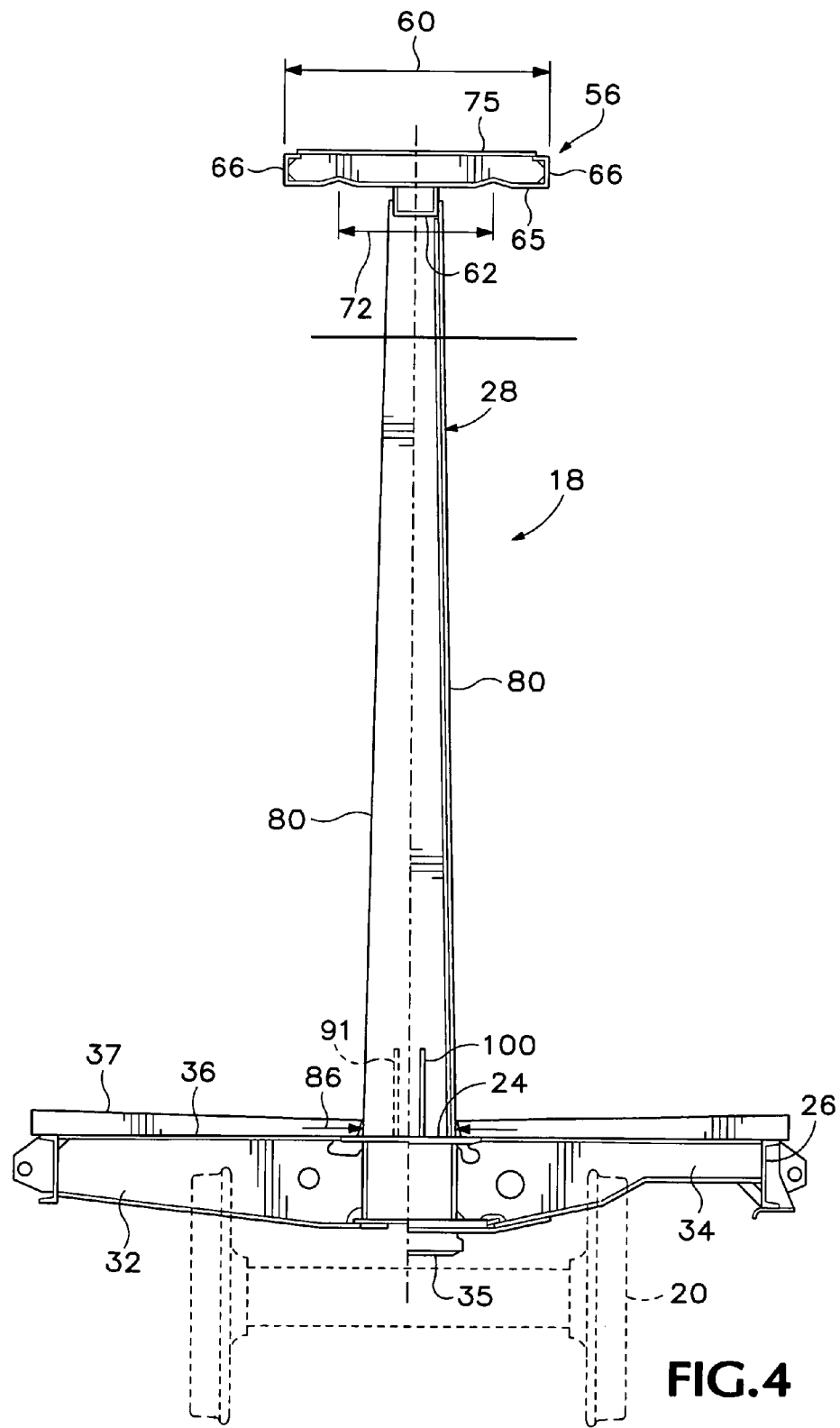
FIG. 4 is a sectional view taken along line 4-4 of FIG. 2, showing the configuration of a body bolster, a central column, and a crossbearer of the railroad car shown in FIG. 1.

Referring now to the drawings which form part of the disclosure herein, in FIG. 1 a center beam railroad freight car 16 includes a car body 18 having a pair of opposite ends 19. The car body 18 is constructed largely of structural steel tubing and sheet or plate steel and is carried on a pair of conventional wheeled trucks 20. The car 16 includes a conventional coupler 22 at each end 19. Customary accessories such as ladders, brake hand wheels, and the like ordinarily present on a railroad car are not shown in FIG. 1, for the sake of clarity and simplicity.

The railroad freight car 16 includes a longitudinally extending center sill 24 and a pair of side sills 26 extending longitudinally of the car body 18 on either side of the center sill 24. A center beam structure 28 extends upward above the center sill 24 and extends longitudinally of the car body 18 between a pair of upright transversely extending bulkheads 30 located at the opposite ends 19. The bulkheads 30 may be spaced apart from each other by a nominal car length 31 of 73 feet, for example, which leaves enough room between the bulkheads 30 and bundles of lading, typically having lengths that are multiples of 4 feet, to be arranged on the cars.

Referring also to FIGS. 2, 3, 4, and 5, crossbearers 32 or less substantial crossties (not shown) may extend laterally from the center beam 28 to the side sills 26 on either side of the center sill 24 at regular intervals along the length of the car body 18, except at the location of each of the trucks 20, where a body bolster 34 of more substantial structure includes a center bearing 35 for the truck 20 and extends transversely on either side of the center sill 24 to the respective side sill 26. Atop the crossbearers 32, the crossties, and the body bolsters 34 may be a floor sheet 36 extending the length of the car on each side of the center beam 28, closing the spaces between the center sill and side sills and interconnecting the crossbearers 32, crossties, and body bolsters 34. Risers 37, which may be channels of formed steel sheet with tapered flanges, may be located atop the floor sheet 36, above and aligned with the crossbearers 32 and body bolsters 34. Additional risers 37 may also be located at intervals along the length of the car body 18 in locations where there are no crossbearers 32 nor bolsters 34. These additional risers 37 may be supported by crossties or flat bar reinforcing members (not shown) attached to the floor sheet 36 as part of or instead of crossties between crossbearers 32 and bolsters 34. The risers 37 may each provide a cargo-supporting top surface sloped slightly downward toward the center beam 28.

The bulkheads 30 at the ends 19 of the car body 18 are both of similar construction and may include a pair of vertically-extending Z shaped corner post members 38 of formed plate, each corner post 38 having its bottom end attached to the respective side sill 26. A transverse horizontal top channel member 40 of formed steel may extend between and interconnect the tops of the corner posts 38. Gussets 42 may provide reinforcement. A face sheet 44 may be located on the inner side of the bulkhead 30, facing toward the opposite end 19 of the car body 18. A central vertical stiffener 46 of "T" shape in section may extend from the center sill to one flange of the horizontal channel member 40, with a web plate 48 forming the stem of the "T" welded to and extending vertically along the outer side of the face sheet 44. A separate chord plate 50 may be welded to the plate 48, forming the cap of the "T."

The face sheet 44 may be reinforced by horizontal stiffener members 52 such as formed channels arranged with the legs of the channels abutted against the face sheet 44. The reinforcing horizontal channel members 52 may extend over the full width of the bulkhead 30 between the corner posts 38, and are spaced vertically apart from one another along the face sheet 44, to which they are welded. Cutouts for the horizontal stiffeners 52 may be provided in the web plate 48 of the T shaped central vertical stiffener 46, and small filler diaphragms 53 of the same thickness as the web plate 48 may be welded inside some of the channels 52, in line with the web plate 48, as shown. An upright triangular gusset 54 may be located on the center line of the car body, aligned with the stem 48 of the vertical stiffener 46 and extending longitudinally toward the opposite end of the car from a lower portion of each bulkhead 30. The gusset 54 may be fastened to the top of the center sill 24 to carry stresses between the base of the bulkhead 30 and the center sill.

At the top of each bulkhead 30 a top chord 56 which is part of the center beam 28 is attached to a laterally central portion 58 of the top of the bulkhead 30. The top chord 56 has a width 60 of 36 inches, for example, and extends for the entire length of the car body 18 to the other bulkhead 30 at the opposite end 19. The top chord 56 includes a bottom member 62, which may be of "U"-shaped channel form, and which may be roll formed or otherwise formed of steel plate. The channel may be, for example, of 5/16 inch steel plate, with a width 63 of about 6 inches and a depth 64 of about 4 inches. A wide, generally horizontal upper member 65 of the top chord 56 may be roll formed of an integral steel plate and may extend over the entire width 60 of the top chord 56. Alternatively, the upper member 65 may be of plate bent in a brake to achieve the required form. While it may be preferred to make a longitudinally-extending section from a single piece of plate, it could also be made as two lateral halves to be welded together. The upper member 65 is welded or otherwise securely fastened in place atop the channel or bottom member 62, and may extend evenly on both sides thereof. A laterally outer reinforcing portion in the form of a side channel 66 may extend longitudinally along each side of the upper member 65. The side channel 66 may face openly inward and may have a height 67 of about 4 inches, and an upper flange 68, directed laterally inwardly toward the longitudinal centerline of the top chord 56, may have a width of about 2.25 inches.

A pair of stiffening ridges 69 may be formed in the upper member 65, so as to extend longitudinally parallel with the flanges 68, spaced symmetrically apart with respect to the central bottom member 62. Each stiffening ridge 69 may be symmetrically formed, with evenly sloped sides spanning a width 70 of about 5 inches and having a ridge height 71 of 0.5 inch in one embodiment. The width 70 might be satisfactorily chosen to be in the range from about 3 inches to about 6 inches, and the height 71 might be in the range of 0.4 inch to 1.5 inches. The stiffening ridges 69 may be spaced apart laterally so as to be about centrally located between the bottom member or channel 62 and the laterally outer reinforcing portion or side channel 66 on each side, thus having, for example, a spacing 72 between ridge tops of about 21 inches. Oppositely formed stiffening channels (not shown) could be provided instead of ridges.

Since a major part of the load carried by the top chord 56 is in the form of compression in a longitudinal direction to counteract bending in a vertical longitudinal plane in the middle of the length of the car body 18, a longitudinally central portion 73 of the upper member 65, 40 feet in length in one embodiment, may be formed of plate having a thickness of, for example, ¼ inch, while the portions 74 of the upper member 65 adjacent each bulkhead 30 may be of plate having a lesser thickness of, for example, 3/16 (0.1875) inch. Transverse reinforcing and connecting members 75, spaced apart at regular intervals of 48 inches, for example, along the length of the top chord 56, may be formed of sheet steel and include a horizontal transverse portion 76 welded to each of the side channels 66, and a vertical transverse portion 77 welded to each of the side channels 66 and to the upper surface of the upper member 65 between the side channels 66. Drain holes 78 may be provided in the upper member 65.

The channel or bottom member 62 abuts against and is welded or otherwise securely fastened to a flange of the horizontal top channel 40, and each of the side channels 66 extends above the top channel 40. As shown best in FIGS. 2 and 6A, the top chord upper member 65 may rest on the top of the horizontal top channel 40 of the bulkhead 30, and a pair of triangular gussets 79 may interconnect the two side channels 66 to the top of the horizontal channel 40.

Figure 5:
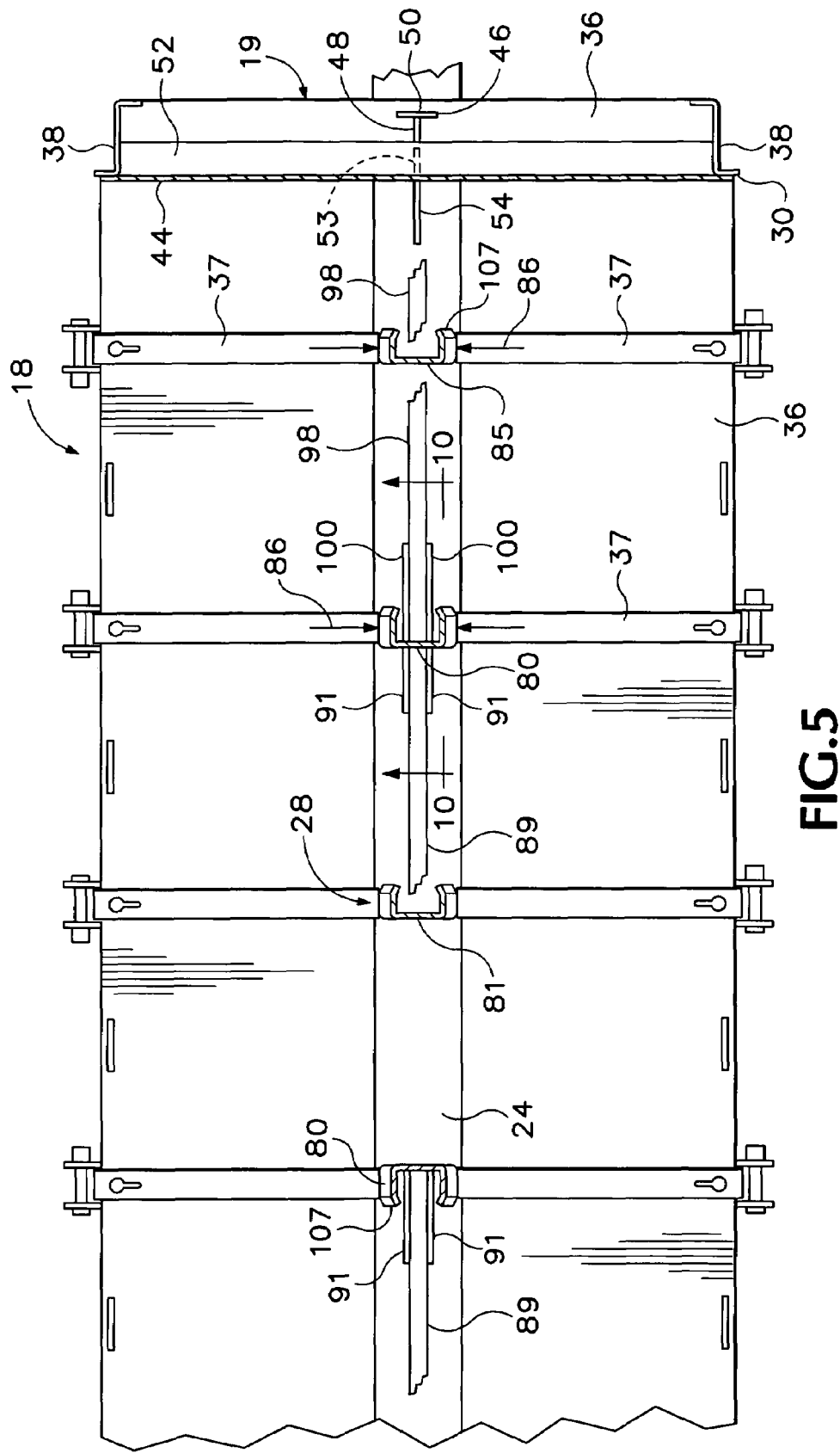
FIG. 5 is a sectional view of a portion of the railroad car shown in FIG. 1, taken along line 5-5.
Figure 9:
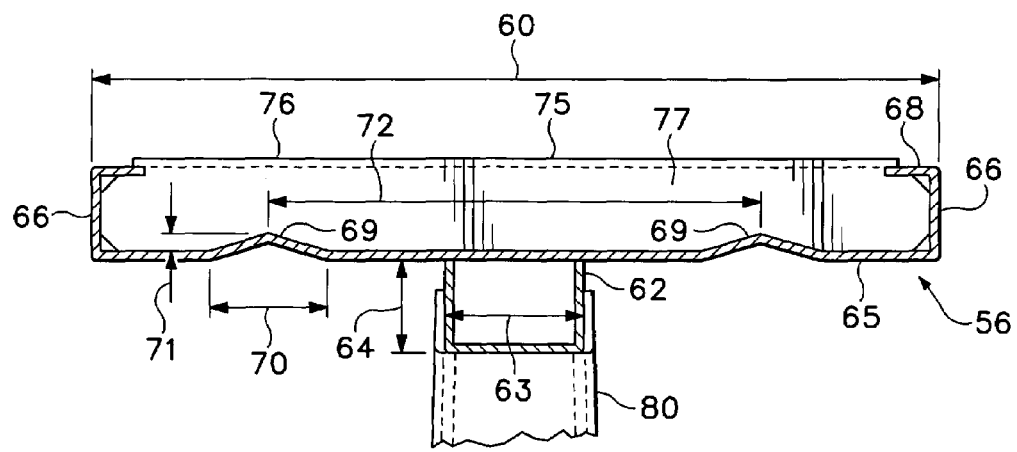
FIG. 9 is a sectional view taken along line 9-9 of FIG. 2, at an enlarged scale.

Interconnecting the center sill 24 with the top chord 56 are several upright center columns 80, 81, 82, 83, 84, and 85, each of which may be of formed plate with a "C"-shaped cross-section shape channel including a transversely extending middle portion and a pair of longitudinally extending side portions, or flanges arranged in the shape of a capital "C" as seen in section (FIG. 5). The side portions may include inwardly angled narrow marginal strips 107 as seen best in FIGS. 5 and 11B, to avoid presenting sharp edges along the columns where lading would rest against the columns.

The columns 80, each located above a body bolster 34 or a crossbearer 32, may be constructed of somewhat stronger material, such as ⅜ inch steel plate. Several columns 81, 82, 83, 84, and 85 may be of formed plate construction similar to that of the columns 80, but may be of somewhat lighter plate, such as 5/16 inch steel plate. Columns 80, 81, 82, 83, 84 and 85 may be tapered from a greatest lateral width 86 at the lower end of each, which is welded to the center sill 24, to a minimum width at the upper end of each, as may be seen in FIG. 4. The upper end of each of the columns 80-85 is attached to the channel or bottom member 62 of the top chord 56, by, for example, welding extensions of the flanges or side portions included in each column to the respective sides of the channel or bottom member 62.

Figure 15:
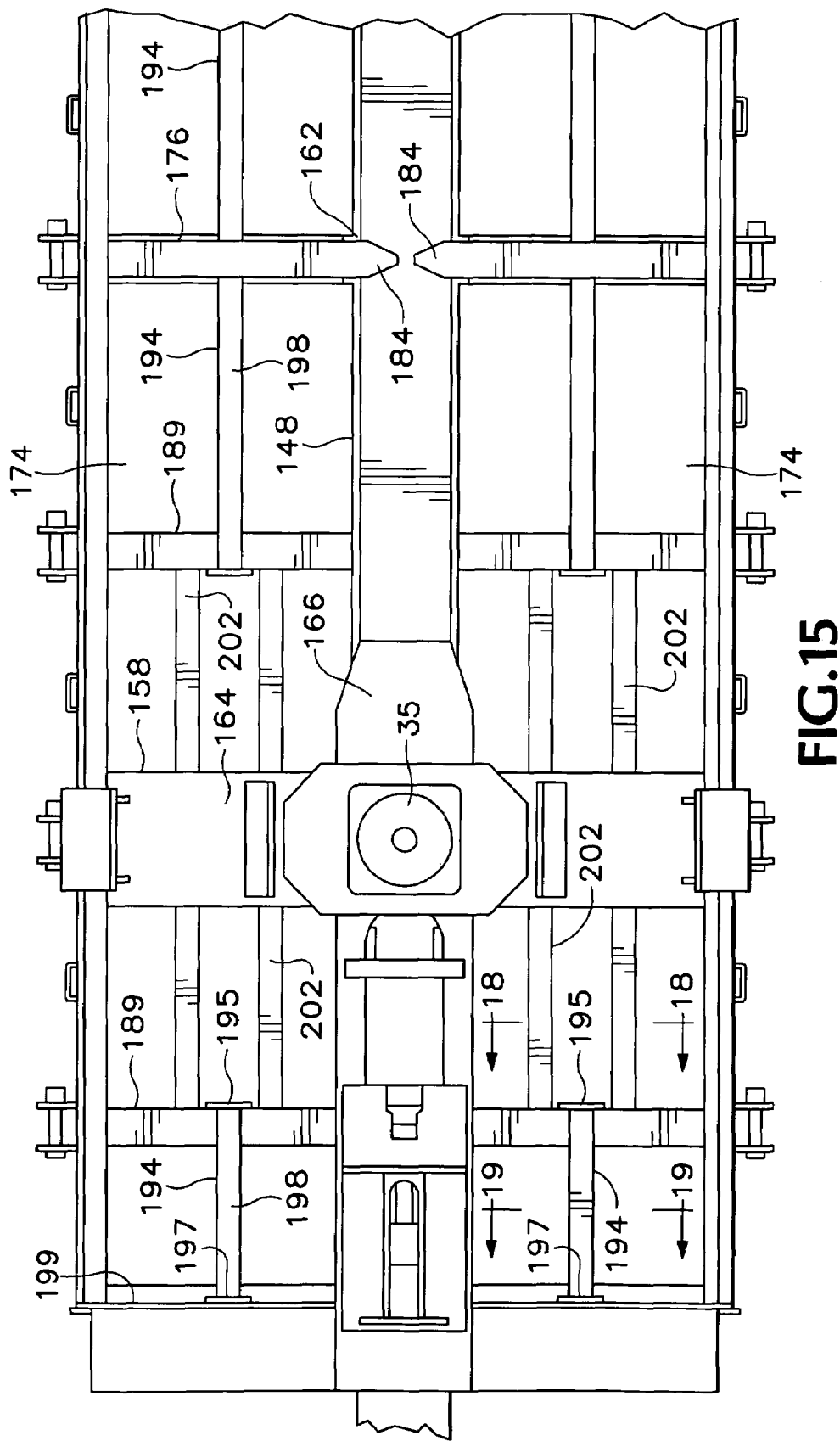
FIG. 15 is a bottom plan view of the portion of a car shown in FIGS. 13A and 14, from which the wheeled truck has been omitted.

The locations of the crossbearers 32 and body bolsters 34 coincide with the locations of respective columns 80 and 83 spaced apart longitudinally of the car body 18 at center-to-center distances of, for example, 96 inches. The columns 81, 82, 84, and 85 are spaced apart from the nearest column 80 or 83 by a center-to-center distance of, for example, 48 inches, and may be aligned with respective ones of the risers 37 and crossties (not shown), transverse structural support members of lighter construction than the crossbearers 32 and located between successive crossbearers 32 as in the underframe structure shown in FIG. 15. The columns may be thus spaced apart by a distance of which the length of a typical bundle of lading is a multiple. The spacing of the columns 80 located above the body bolsters 34, on which the center bearings 35 for the wheeled trucks 20 are carried, is thus sixty (60) feet, in the railroad freight car 16 shown. With a length 31 between the bulkheads 30 of about 73 feet, the length of longitudinal overhang 105, beyond the body bolsters 34 and longitudinally outboard of the associated center bearings 35 for the trucks 20, may be kept relatively small. Each of the upright center beam columns 81-85 may have a height 87 of about 136 inches, for example, to the bottom of the channel or bottom member 62 of the top chord 56.

Figure 13B:
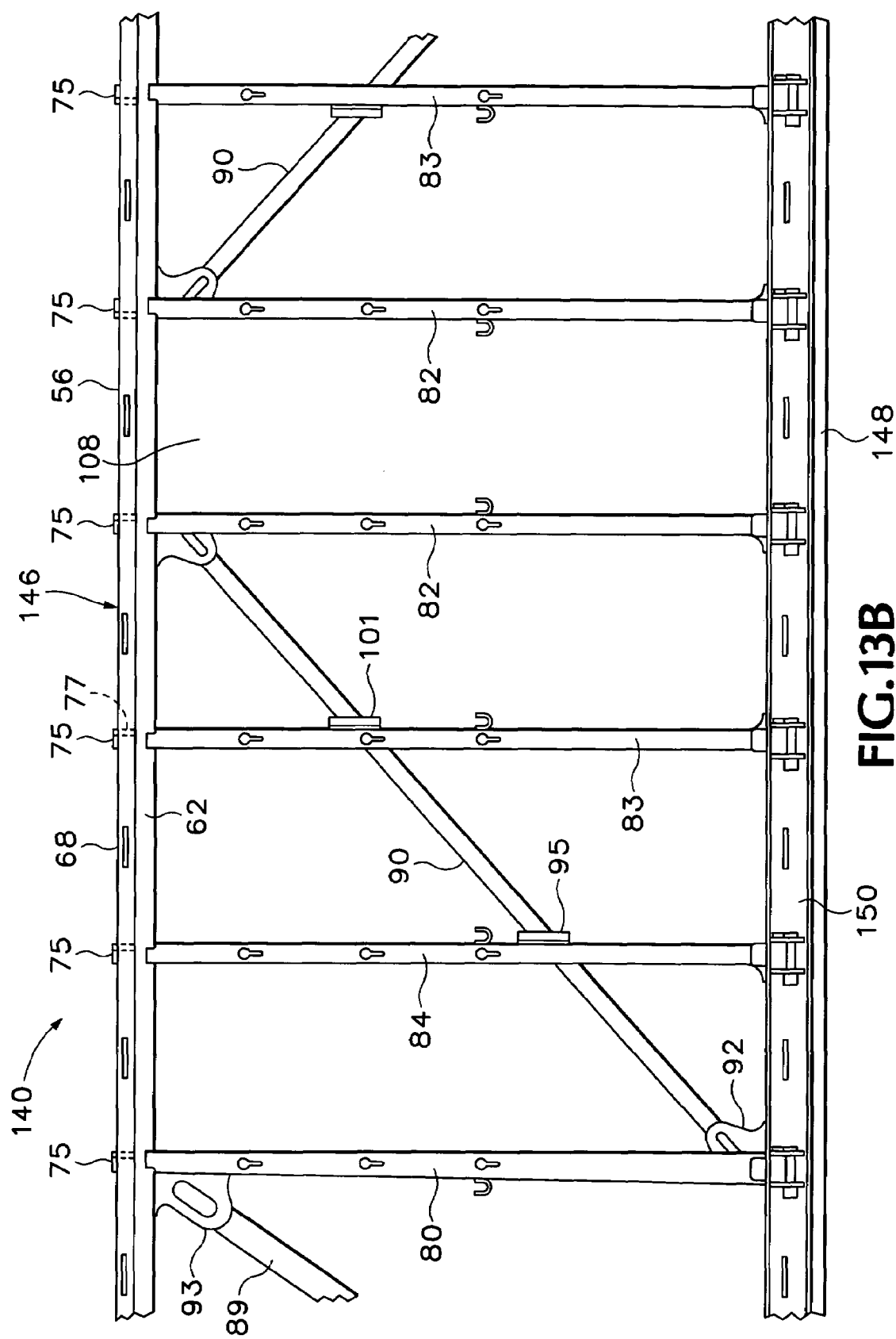
FIG. 13B is a side elevational view of a middle portion of the railroad car shown in FIG. 13A.
Figure 14:
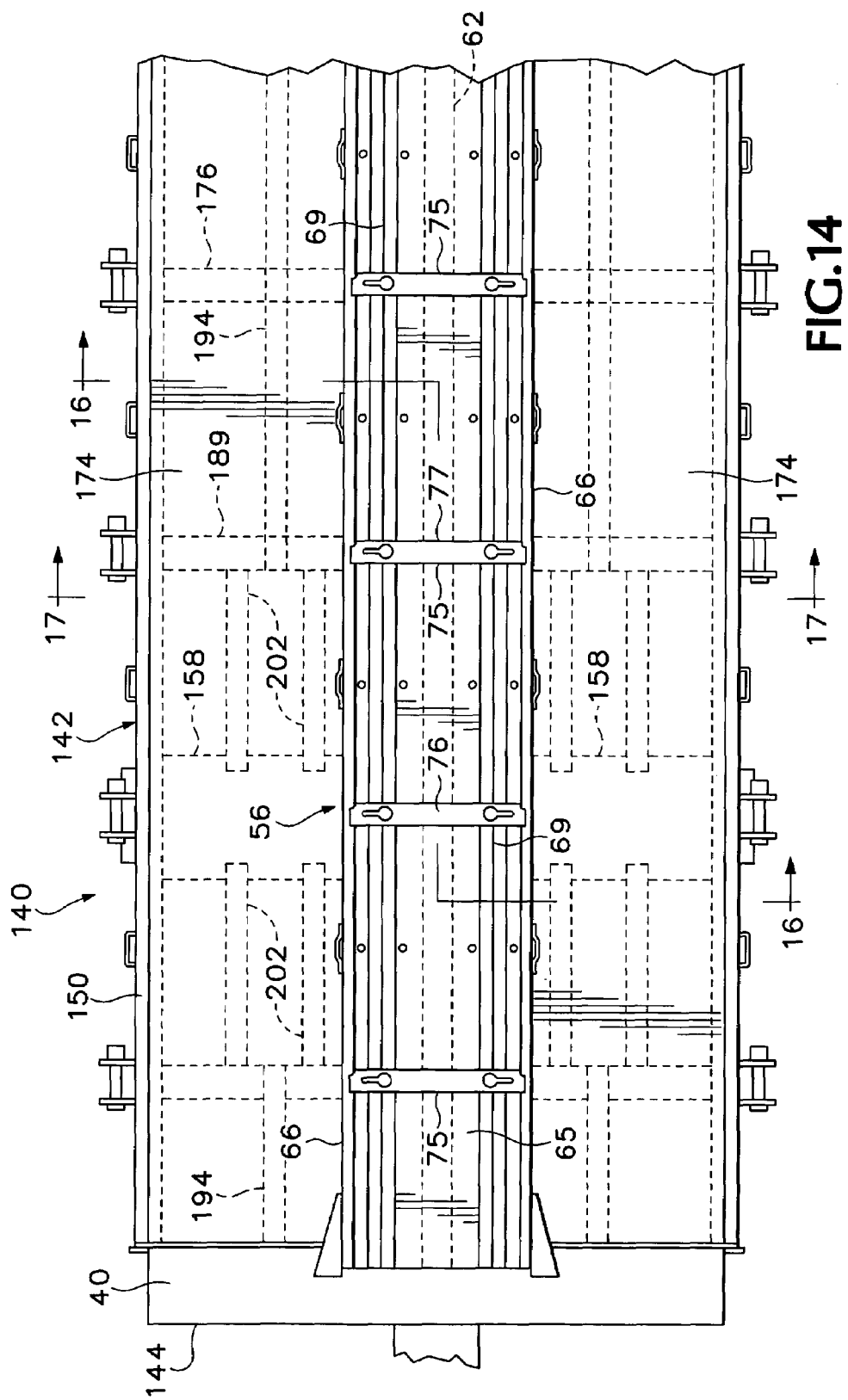
FIG. 14 is a top plan view of the portion of a car shown in FIG. 13A.

Spaced apart longitudinally along the center beam 28 are diagonal structural members 88, 89, and 90. These members may each have a lower end attached to a respective one of the center beam columns 80 and to the center sill 24 by respective pairs of attachment plates 91, 92, and each may have an upper end attached to a respective one of the center beam columns 80 or 82, and to the channel or bottom member 62 of the top chord 56, by a respective pair of attachment plates 93, 94. The lower end of each of the diagonal members 88, 89, and 90 is closer to the nearer end 19 of the car body than is the upper end, and the diagonal members 88, 89, and 90 are therefore loaded primarily as columns in compression, to carry shear loads within the center beam 28. The diagonal members 88, 89 and 90 may be of rectangular tubular steel construction, and the diagonal members 88 and 89 may be of heavier construction than the longer diagonal members 90, in order to carry larger forces expected to be encountered at their locations. The two diagonal members 90 are longer than the diagonal members 88 and 89 and slope further from vertical, and their lighter weight helps to minimize the weight of the car 16. Each diagonal member 90 thus may extend diagonally from the center sill adjacent a column 80 through two columns 84 and 83, to the top chord 56 adjacent a column 82. For example, the elongate diagonal structural members 88, 89, and 90 may all be of rectangular steel tubing 6 inches deep and 3 inches wide, but of 3/16 inch wall thickness in the diagonal members 90 and of 5/16 inch wall thickness in the diagonal members 88 and 89. A central portion of each of the diagonal members 88 and 89 passes through an aperture defined in a respective one of the columns 81, and a V shaped strap 97 (or a strap 97' as shown in FIG. 13A) has one leg welded to the transverse web of the respective column 81 and another leg resting on the respective diagonal member 88 or 89 to provide a measure of support to the middle of the diagonal member 88 or 89 yet allow some movement relative to the column 81.

Figure 11A:
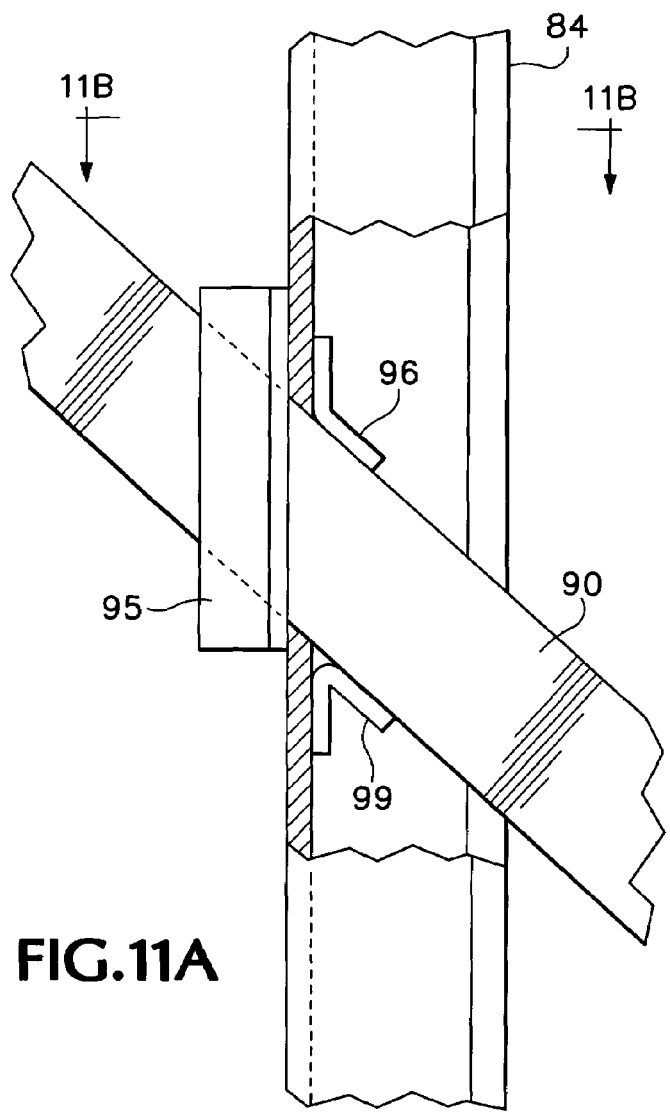
FIG. 11A is a partially cutaway side elevational detail view of the interconnection of a diagonal member of the center beam with a column.
Figure 11B:
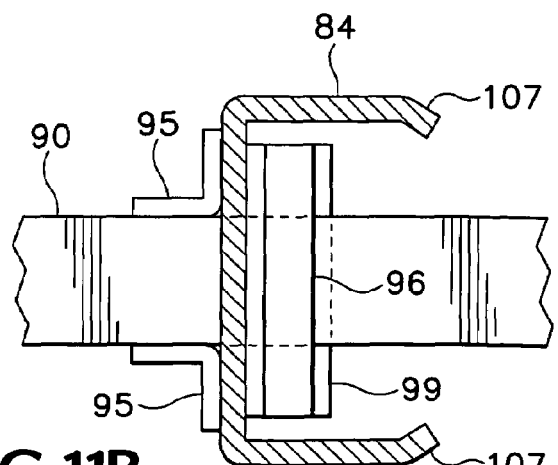
FIG. 11B is a detail view taken on line 11B-11B of FIG. 11A.

Support to resist buckling may be provided where the longer diagonal structural member 90 passes through the column 84. As shown in FIGS. 11A and 11B, a short length 95 of angle stock extends vertically alongside each lateral side of the diagonal member 90 and is welded to the outside of the transversely extending portion of the column 84. A bent plate 96 extends horizontally between the flanges of the column 84 and is attached, as by welding, to the interior side of the transversely extending web portion of the column 84 and rests on the top of the diagonal member 90. A plate 99 bent to an acute angle is similarly located and attached to the column 84, but rests against the underside of the diagonal member 90. A pair of lengths 101 of angle stock are located on respective sides of the diagonal member 90 where it passes through the adjacent column 83 closer to the top chord 56.

The upper end of each longer diagonal structural member 90 is attached to the top chord 56 adjacent a respective column 82 near the mid-length of the car 16, leaving a center space 108, between the columns 82, that includes the mid-length part of the car body 18 and that is not spanned by any such elongate diagonal structural member.

This arrangement of the diagonal members 88, 89, and 90 results in the lower end of one of the diagonal members 89 resting atop the center sill 24 at the location of the body bolster 34.

Figure 10:
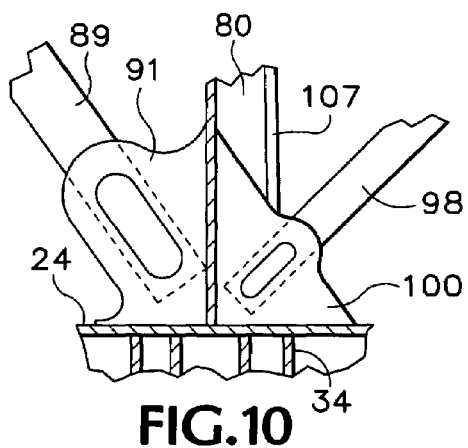
FIG. 10 is a sectional view taken along line 10-10 of FIG. 5, at an enlarged scale.

At each end 19 of the car body 18, extending from the respective bulkhead 30 to the column 80 located above the body bolster 34 located closer to the respective end 19, may be a short, diagonal, bulkhead brace structural member 98 shown best in FIG. 6A. A suitable diagonal bulkhead brace member 98 may be of rectangular tubular steel material, for example 4 inches×3 inches in size, with a 5/16-inch wall thickness. As seen best in FIG. 10, a lower end of the diagonal bulkhead brace member 98 is attached to the top of the center sill 24 and to the column 80, above the body bolster 34 and the center bearing 35, in a lower interior corner located in the intersection of the column 80 with the center sill 24, by a pair of attachment plates 100, one of which may be welded to each lateral side of the bulkhead brace member 98. The diagonal bulkhead brace member 98 extends diagonally upward, as part of the center beam 28, through an opening defined in the column 85, the center beam column closest to the bulkhead 30, and its upper end is attached to the bulkhead 30 as by being welded between a pair of vertically and longitudinally extending attachment plates 102.

As shown in FIGS. 7 and 8, the attachment plates 102 are welded to the face sheet 44 of the bulkhead 30, extending through slots 103, slightly wider than the thickness of each attachment plate 102, defined in the face sheet 44. A pair of parallel flat backing bars 104 are welded alongside the attachment plates 102 on the opposite, outer, side of the face sheet 44, where they extend vertically and transversely of the car body 18 between the nearest ones of the horizontal channels 52 located upwardly and downwardly adjacent the location of the attachment plates 102. Once the backing bars 104 are in place the excess width of the slots 103 may be welded up flush with the face sheet 44. Additional reinforcement plates 106 are oriented horizontally and extend transversely behind the horizontal channels 52. The reinforcement plates 106 are attached to the web plate 48 and to the chord plate 50 of the T-shaped vertical stiffener 46, securely interconnecting the top and bottom margins of the vertical reinforcement plates 102 with the vertical stiffener 46. An outer vertical margin 108 of each vertical reinforcement plate 102 also may be welded to the chord member 50 of the vertical stiffener 46.

The above-described structure of the center beam 28, with all of the columns 81-85 in "C" section form, and with the described top chord 56, not having fabricated center columns of "H" section shape and not having as many elongate diagonal structural members 89 as were used in previous center beam railroad cars, result in a center beam 28 which is several hundred pounds lighter than the previously used center beam structure. Additionally, labor savings in not having to assemble "H" section central columns reduce construction costs of the car 16 compared with previously known cars.

Figure 12:
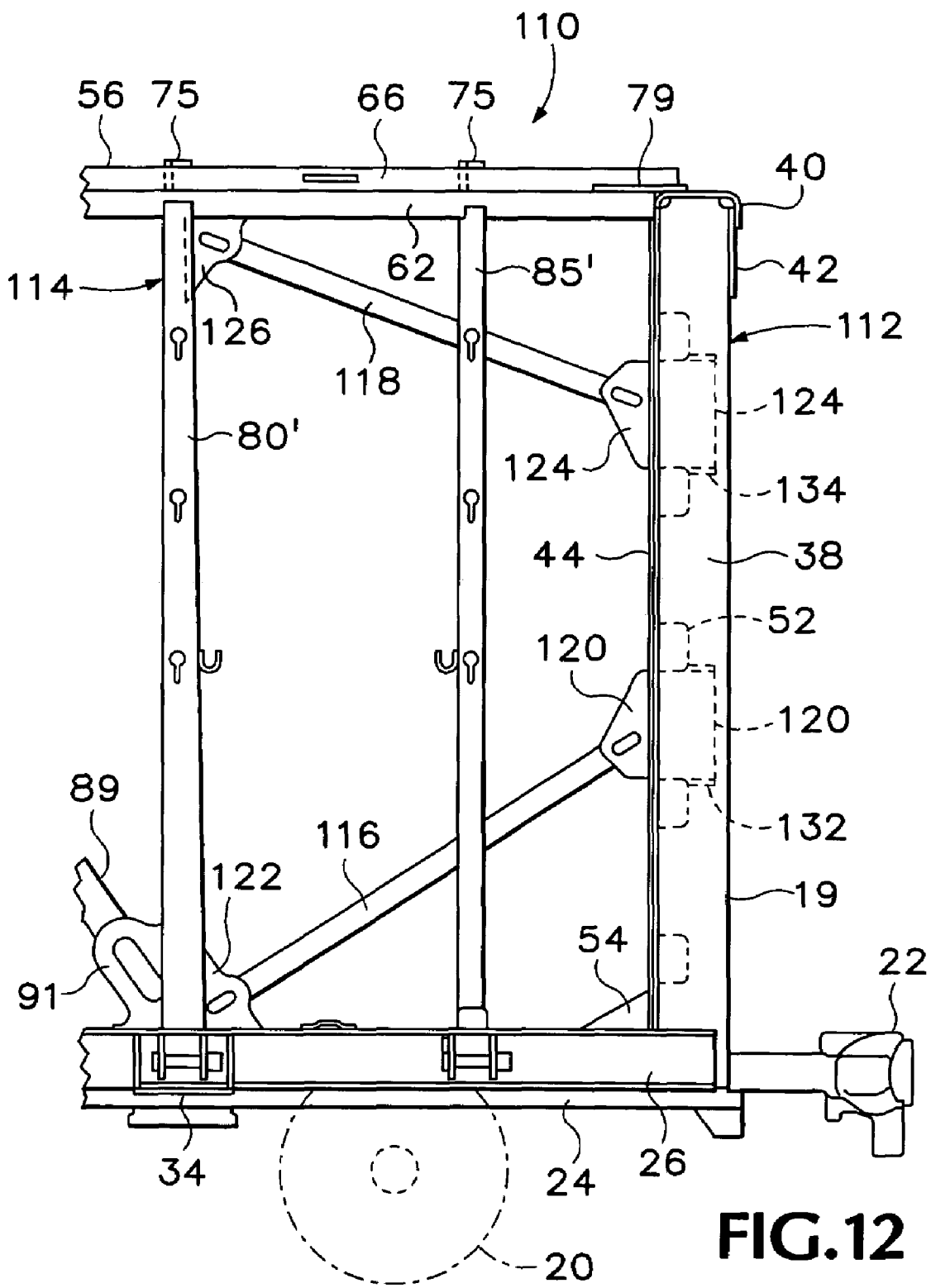
FIG. 12 is a side elevational view of a portion including one end of a railroad car which is an alternative embodiment of the present invention.

A portion of a car body 110 which has an alternative structure is shown in FIG. 12 in side elevation view. The car body 110 includes at each end 19 a bulkhead 112 which may be generally of similar structure to that of the bulkhead 30. The car body 110 includes a center beam 114 similar in most respects to the center beam 28 previously described. The top chord 56 of the center beam 114 is attached to the horizontal top channel 40 of the bulkhead 112 as in the car body 18, and the base of the bulkhead 112 is attached to the center sill 24 and side sills 26 as in the car body 18. The center beam 114 includes a column 85' closest to the bulkhead 112 and a column 80' located above a body bolster 34 which rests atop a truck 20. The principal difference from the car body 18 is that a pair of short diagonal bulkhead brace members 116 and 118 extend from respective intermediate heights along the bulkhead 112 as part of the center beam 114. The lower bulkhead diagonal brace 116 extends from a respective pair of attachment plates 120 on the bulkhead 112 to a pair of attachment plates 122 in the lower interior corner formed by the center sill 24 and the column 80'. The upper bulkhead diagonal brace member 118 extends from a respective pair of attachment plates 124 located on the bulkhead 112, spaced above the attachment plates 120 by a distance established by the locations of two of the horizontal stiffeners 52 of the bulkhead 112, to a respective pair of attachment plates 126 in an upper interior corner defined by the top chord 56 and the column 80'. Horizontal reinforcement plates 132 and 134 correspond to the reinforcement plates 106 of the bulkhead 30. Each of the diagonal braces 116 and 118 extends through a respective aperture defined in the column 85'.

In a railroad freight car 140 which is another alternative structure, a car body 142 is generally similar to the car body 18 and includes a pair of opposite ends, of which one end 144 is shown in FIG. 13A. As many of the components of the structure of the car 140 may be substantially the same as corresponding parts of the railroad car 16 previously described, the same reference numerals are used in FIGS. 13-17 to identify those parts of the car 140, and those parts will not be described again in detail with respect to the car 140.

Thus, at each of the opposite ends of the car 140 is a bulkhead 30, and a center beam 146 extends longitudinally of the car 140 along its vertical center plane between the opposite bulkheads 30. The upper portions of the center beam 146 are similar to those of the center beam 28 described previously. At the base of the center beam 146, however, the structure of the freight car 140 differs from that of the car 16 previously described.

The car 140 includes a center sill 148 corresponding to the center sill 24 and extending longitudinally of the car body 142 along a longitudinal central plane of the car body. Extending parallel with the center sill 148 on each side of the car body 142 are a pair of symmetrically opposite side sills 150 spaced laterally apart from the center sill. As may be seen in FIG. 16, each side sill 150 may be fashioned as an outwardly open channel of bent plate having upper and lower flanges 152, 154, respectively, that extend laterally outwardly from a vertical web 156.

Spaced a distance apart from each end 144 of the car body 142 is a body bolster 158 extending transversely between the side sills 150 on each side of the car and interconnecting them with the center sill 148. The body bolster 158 may be of conventional stiffened box-beam configuration, with a top flange 160 abutting a top plate 162 of the center sill 148 and a bottom flange 164 abutting a bottom plate 166 of the center sill. A pair of parallel vertical webs 167 extend laterally, spaced several inches apart from each other along the length of the car body. A laterally outer end of the top flange 160 of the body bolster 158 abuts against the side sill 150 and may be aligned with the upper flange 152 thereof. The top flange 160 may be inclined downward at a small angle 172 below horizontal, extending laterally inwardly from the upper flange 152 toward the top flange 162 of the center sill 148, so that the upper flange 152 and the top flange 160 of the body bolster 158 are substantially perpendicular with the plane 169 of the upwardly-and-inwardly inclined outer face 168 of the corresponding column 74 of the center beam 146, as indicated at 170. As may be seen in FIG. 16, where one half of a body bolster 158 is depicted, laterally outboard portions of the body bolster 158 may be of shallower depth than the laterally inboard portions, to provide clearance for the wheels of a truck (not shown) to support the associated end of the car body 142.

A floor sheet 174, of 1/8-inch steel, for example, rests atop the top flange 160 of the body bolster 158 and thus may also be inclined laterally inwardly and downwardly from the side sill 150 toward the center sill 148 and oriented normal to the imaginary plane 169 established by the upwardly-and-inwardly inclined outer face 168 of the column 80 above the body bolster 158 and the coplanar outer faces of the other upright columns 81-85 of the center beam 146.

Located at regular intervals along the length of the car body 142 at locations other than those of the body bolsters 158 several symmetrically opposite pairs of crossbearers 176 may extend transversely of the car body on each side, between the center sill 148 and the side sills 150. The crossbearers 176 may be weldments of l-shaped cross section, tapering from a greatest depth adjacent the center sill 148 to a shallower depth at the laterally outboard end of each crossbearer 176, where the depth of the crossbearer 176 may be somewhat less than that of the side sill 150.

A top flange 178 of each crossbearer 176 may be aligned with the top flange 162 of the center sill 148 and the upper flange 152 of the side sill so that the location of the top flange 178 corresponds with the location of the top flange 160 of each body bolster. The top flange 178 thus also may be inclined slightly downwardly toward the center sill 148 and may be substantially perpendicular to the plane 169 of the nearer side of the center beam 146, defined by the columns 80-85, as indicated at 180. The floor sheet 174 may also rest atop and may be welded to the top flange 178 of each crossbearer 176.

A bottom flange 182 of each crossbearer 176 may extend from the web 156 of the side sill 150 toward the center sill 148. An inboard end portion 184 of the bottom flange 182 may extend inboard beneath and be welded to the bottom plate 166 of the center sill 148, in order to integrate the structure of the crossbearer 176 with the center sill 148 and the side sill 150. A diaphragm 186 may be located within the center sill 148, aligned with the web 188 of the crossbearer 176.

At the locations between crossbearers 176 and body bolsters 158, corresponding to the locations of columns 72 and 76 of the center beam 146, crossties 189 may also extend between the center sill 148 and the opposite side sill 150, as shown in FIG. 17. Each of the crossties 189 may be an upright. U shaped channel of ⅛-inch sheet steel, for example, with upper margins 190 of the upright side walls 192 of each crosstie 189 being aligned with the top of the center sill 148 and the top of the side sill 150. The upper margins of the crossties 189 are thus parallel with the top flanges 160 and 178 of the body bolsters 158 and crossbearers 176 and similarly are perpendicular to the plane 169 of the nearer face of the center beam 146. The bottom of each crosstie 189 may also be parallel with the top flanges 160, 178 of the body bolsters 158 and crossbearers 176. The upper margins 190 at the inboard end of each crosstie 189 may be shaped to fit beneath the top flange 162 of the center sill 148, and may be welded thereto. The opposite ends of the crossties 189 may be welded, respectively, to the center sill 148 and the side sill 150, while the upper margins 190 of the side walls 192 of the crossties 189 may be welded to the bottom of the floor sheets 174.

Figure 18:
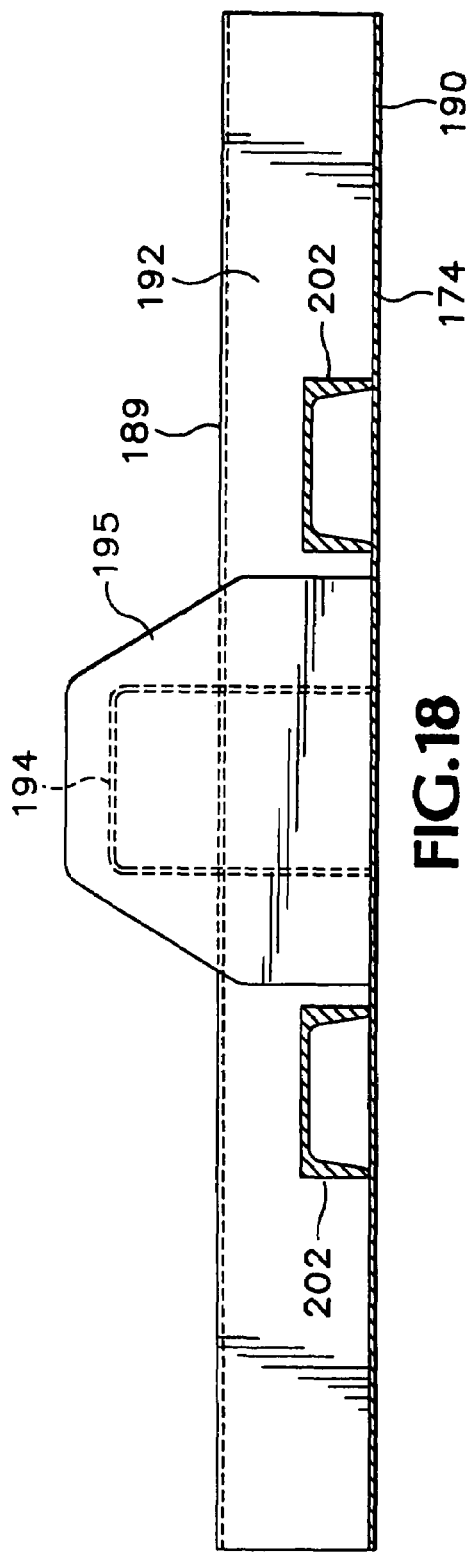
FIG. 18 is a section view taken along line 18-18 of FIG. 15, at an enlarged scale.
Figure 19:
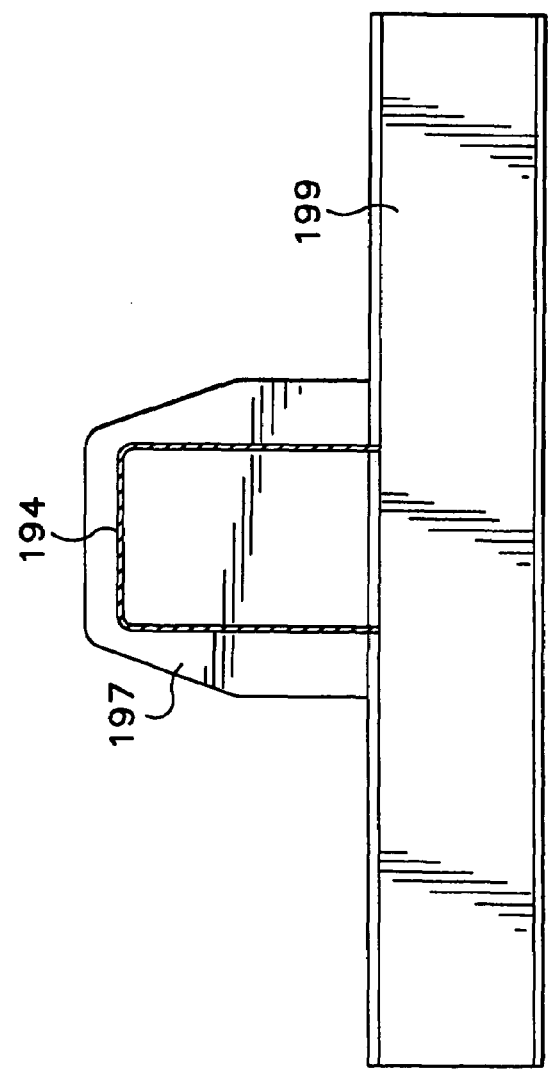
FIG. 19 is a section view taken along line 19-19 of FIG. 15, at an enlarged scale.

To provide further support and stiffening of the floor sheets 174, stringer channels 194 may extend longitudinally of the car body 142, parallel with the center sill 148 and side sills 150 and spaced midway between them, except in the area adjacent to the body bolster 158 at each end 144 of the car body 142. The stringer channels 194 may be of ⅛-inch sheet steel, and each stringer channel 194 in one version may have a pair of upwardly extending side walls 196 joined by a horizontal base 198. The upper margins 200 of the side walls 196 may be welded along their full lengths to the bottom of the floor sheets 174, which closes the channels to form box beam structures including parts of the floor sheet 174. Each end of each stringer channel 194 may be welded to an end plate 195 adjacent a respective crosstie 189 as shown in FIG. 18, or to a slightly different end plate 197 adjacent an end sill 199 at an end 144 of the car body 142, as shown in FIG. 19. Openings are provided in the upper portions of the side walls 196 of the stringer channels to fit closely around the crossties 189, and the margins of such openings may be welded to the side walls 192 and base of the crosstie 189 at each intersection of a crosstie 189 with a stringer channel 194.

In the spaces between each body bolster 158 and the adjacent crosstie 189, a pair of shallow stringer channels 202 of rolled channel stock, such as C4×5.4 lb/ft channel, may extend parallel with each other, the center sill 148, and side sills 150, and the shallow stringer channels 202, the side sill 150, and the center sill 148 may be spaced equidistantly apart from each other. Each of these shallow stringer channels 202 may be of similar width but shallower depth than the stringer channels 194, in order to provide ample room for a wheeled truck supporting the car through the respective body bolster 158. One end of each shallow stringer channel 202 may be welded securely to a side wall 192 of the respective one of the crossties 189, while the other end is notched and welded to the under side of the top flange 160 of the body bolster 158. The upper margins 204 of the shallow stringer channels 202 may be welded along their full lengths to the bottom of the floor sheet 174, which closes the shallow stringer channels 202, forming box beam structures.

The deck structure of the car body 142 as shown thus includes the center sill 148, the side sills 150, the body bolsters 158, crossbearers 176, crossties 189, stringer channels 194 and 202, and the floor sheet 174, all welded fully together to form a stiff, unified, underframe. This structure has ample strength, even though constructed of lightweight components, to carry the loads imposed on such a center beam car 140 during operation as part of a train. Furthermore, the inwardly-sloping orientation of the floor sheets 174, together with the ample support provided by the crossbearers 176, crossties 189, and stringer channels 194 and 202, makes it unnecessary to utilize dunnage beneath prepackaged bundles of cargo. This has the advantage of permitting approximately an additional inch of cargo height to be loaded on a car whose center beam car 146 has the same height as that of the center beam car 16, without extending beyond the available space.

Referring to FIG. 20, a top chord 210 may be used in place of the top chords 56 of the center beams 28 and 146 as described above with respect to FIGS. 1-19. The top chord 210 includes a main member 212 that extends longitudinally along the center beam 28 of which it is apart. Transverse members 214 may be essentially similar to transverse members 75 included in the top chord 56 described above, and are spaced apart similarly along the top chord 210.

The main member 212 resembles the upper member 65 except that instead of having a flat laterally central portion bridging across a central channel or bottom member 62 as in the top chord 56, the main member 212 is bent to form a centrally located rectangular channel 216 having a width 218 of, for example, 6 inches, and a depth 220 of, for example, 4 inches, so that the main member 212 will fit on and can be attached to the upper ends of the columns 80-85 of the center beam 28 in the same way that the central channel or bottom member 62 of the top chord 56 is attached. The transverse members 214 may be attached to the main member 212 in the same way the transverse members 75 are attached to the upper members 65 in the top chord, except that the transverse members 214 form a bridge across the channel 216. The diagonal members 88, 89, and 90 can thus also be attached to the top chord 210 in the same manner as that used for attaching them to the top chord 56, as described above.

The main member 212 has an overall width 222 which may be about 36 inches, the same as the width 60 of the top chord 56. Stiffening reinforcing parts such as side channels 224 and ridges 226 may have the same form and size as the side channels 66 and ridges 69 described with respect to the top chord 56. Drain holes 228 may be provided through the main member 212, similar to the drain holes 78 in the upper member 65 of the channel 56.

The transverse members 214 include horizontal transverse parts 230, whose outer ends may be welded to the tops of the side channels 224, as shown in FIGS. 20 and 21. The transverse member 214 also include vertical transverse portions 232 whose lower margin is shaped to fit against the upper surface of the main member 212 except for spanning the central channel 216, and may be welded thereto, to stiffen the main member 212. The ends of the transverse members 214 may be cut to provide drainage holes 234, to allow fluids to pass longitudinally along the top chord 210.

The main member 212 may be manufactured by forming a steel plate using conventional roll forming techniques, or by folding using an appropriate brake, and while it may be preferable to prepare the entire width 222 from a single plate it could be prepared as two lateral halves later welded together. While manufacture of the main member 212 by this method is thus more complex than manufacturing the upper member 65 of the top chord 56, the structure of the main member 212 eliminates the need for some welding in the assembly of the top chord 210, as compared with the top chord 56.

As with the top chord 56, the main member 212 of the top chord 210 may be of a greater thickness over a middle portion of the length of the railroad freight car, and of a lesser thickness of the steel plate in the portions of the top chord closer to the end bulkheads 30.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A railroad freight car, comprising:
an elongate body having upstanding transverse bulkheads located at opposite ends of said body and including a vertical center beam extending longitudinally of the car between said bulkheads, the center beam including:
(a) a center sill extending over the length of said body;
(b) a top chord extending parallel with and spaced upwardly apart from the center sill;
(c) a plurality of upright columns extending from said center sill to said top chord and spaced apart from one another by a longitudinal distance along said body; and
(d) an elongate diagonal structural member having a first, lower, end interconnected with said center sill and a second, upper, end interconnected with said top chord at a location spaced apart from said first, lower, end longitudinally along said body by a distance greater than twice as great as said longitudinal distance between adjacent ones of said upright columns;
(e) wherein said center beam is free from any said elongate diagonal structural member in a center space between a longitudinally consecutive pair of said upright columns of said center beam that are located on respective longitudinally opposite sides of a mid-length of said center and
(f) wherein each of said upright columns of said center beam between said transverse bulkheads is of formed plate in a "C" shaped sectional configuration including a pair of longitudinally-directed inwardly inclined flanges and an upright transversely-extending web portion.

2. The railroad freight car of claim 1 wherein said first, lower, end of said elongate diagonal structural member is located adjacent a first one of said upright columns, and said second, upper, and is located adjacent a second one of said upright columns.

3. The railroad freight car of claim 1 wherein said center beam has a pair of opposite sides and said car body includes a respective floor sheet inclined laterally inward and downward toward said center beam and extending along each of said opposite sides said center beam.

4. The railroad freight car of claim 3 wherein said center beam is tapered from a greater width adjacent said center sill to a lesser width adjacent said top chord and defines an inwardly inclined load bearing face of each of said opposite sides thereof, and wherein each of said floor sheets is substantially normal to said load bearing face of a closer one of said sides of said center beam.

5. The railroad freight car of claim 1 including an elongate diagonal structural member having a first, lower, end interconnected with one of said bulkheads at an intermediate height between said center sill and said top chord and a second, upper, end interconnected with said center sill at a location spaced apart from said one of said bulkheads.

6. The railroad car of claim 1 wherein said second, upper, end of a respective one of said elongate diagonal structural members is attached to said top chord adjacent a top end of and on a longitudinal side opposite said central space with respect to each of said longitudinally adjacent pair of said upright columns.

7. The railroad freight car of claim 1 wherein one of said upright columns, together with said center sill, defines a base interior corner, and said first, lower, end of said diagonal structural member is interconnected with both said center sill and said one of said upright columns adjacent said base interior corner.

8. The railroad freight car of claim 1 wherein one of said columns, together with said top chord, defines an upper interior corner, and wherein said second, upper, end of said elongate diagonal structural member is interconnected with both said top chord and one of said columns adjacent said upper interior corner.

9. The railroad freight car of claim 1 wherein said elongate diagonal structural member intersects two intermediately located ones of said upright columns at a location on each of said upright columns between and spaced apart from both said top chord and said center sill.

10. The railroad freight car of claim 9 wherein said elongate diagonal structural member is narrower than each said upright column and extends through an opening defined in a transversely-extending upright web portion of each of said intermediately located ones of said upright columns.

11. The railroad freight car of claim 10 wherein one of said intermediately located ones of said upright columns has support members attached to said transversely extending web portion thereof on each side, above, and below said opening defined therein.

12. The railroad freight car of claim 1 wherein said top chord includes a pair of opposing side portions each extending laterally outwardly away from said upright columns, each of said side portions being of formed plate and including:
(a) a central portion located upwardly adjacent to said upright columns;

(b) a laterally outer reinforcing portion; and
(c) a generally horizontal portion located between said central portion and said laterally outer reinforcing portion, said generally horizontal portion including a stiffening ridge between said central portion and said laterally outer reinforcing portion and extending longitudinally with respect to said center beam.

13. A railroad freight car, comprising:
an elongate body having upstanding transverse bulkheads located at opposite ends of said body and including a vertical center beam extending longitudinally of the car between said bulkheads, the center beam including:
(a) a center sill extending over the length of said body;
(b) a top chord extending parallel with and spaced upwardly apart from the center sill;
(c) a plurality of upright columns extending from said center sill to said top chord and spaced apart from one another by a longitudinal distance along said body; and
(d) an elongate diagonal structural member having a first, lower, end interconnected with said center sill and a second, upper, end interconnected with said top chord at a location spaced apart from said first, lower, end longitudinally along said body by a distance greater than twice as great as said longitudinal distance between adjacent ones of said upright columns;
(e) wherein said center beam is free from any said elongate diagonal structural member in a center space between a longitudinally consecutive pair of said upright columns of said center beam that are located on respective longitudinally opposite sides of a mid-length of said center beam; and
(f) wherein said top chord includes a pair of opposing side portions each extending laterally outwardly away from said upright columns, each of said side portions being of formed plate and including:
  (i) a central portion located upwardly adjacent to said upright columns;
  (ii) a laterally outer reinforcing portion; and
  (iii) a generally horizontal portion located between said central portion and said laterally outer reinforcing portion, said generally horizontal portion including a stiffening ridge between said central portion and said laterally outer reinforcing portion and extending longitudinally with respect to said center beam.

14. The railroad freight car of claim 13 wherein said first, lower, end of said elongate diagonal structural member is located adjacent a first one of said upright columns, and said second, upper, and is located adjacent a second one of said upright columns.

15. The railroad freight car of claim 13 wherein said center beam has a pair of opposite sides and said car body includes a respective floor sheet inclined laterally inward and downward toward said center beam and extending along each of said opposite sides said center beam.

16. The railroad freight car of claim 15 wherein said center beam is tapered from a greater width adjacent said center sill to a lesser width adjacent said top chord and defines an inwardly inclined load bearing face of each of said opposite sides thereof, and wherein each of said floor sheets is substantially normal to said load bearing face of a closer one of said sides of said center beam.

17. The railroad freight car of claim 13 including an elongate diagonal structural member having a first, lower, end interconnected with one of said bulkheads at an intermediate height between said center sill and said top chord and a second, upper, end interconnected with said center sill at a location spaced apart from said one of said bulkheads.

18. The railroad car of claim 13 wherein said second, upper, end of a respective one of said elongate diagonal structural members is attached to said top chord adjacent a top end of and on a longitudinal side opposite said central space with respect to each of said longitudinally adjacent pair of said upright columns.

19. The railroad freight car of claim 13 wherein one of said upright columns, together with said center sill, defines a base interior corner, and said first, lower, end of said diagonal structural member is interconnected with both said center sill and said one of said upright columns adjacent said base interior corner.

20. The railroad freight car of claim 13 wherein one of said columns, together with said top chord, defines an upper interior corner, and wherein said second, upper, end of said elongate diagonal structural member is interconnected with both said top chord and one of said columns adjacent said upper interior corner.

21. The railroad freight car of claim 13 wherein said elongate diagonal structural member intersects two intermediately located ones of said upright columns at a location on each of said upright columns between and spaced apart from both said top chord and said center sill.

22. The railroad freight car of claim 21 wherein said elongate diagonal structural member is narrower than each said upright column and extends through an opening defined in a transversely-extending upright web portion of each of said intermediately located ones of said upright columns.

23. The railroad freight car of claim 22 wherein one of said intermediately located ones of said upright columns has support members attached to said transversely extending web portion thereof on each side, above, and below said opening defined therein.

* * * * *

UNITED STATES PATENT AND TRADEMARK OFFICE
CERTIFICATE OF CORRECTION

| | | |
|---|---|---|
| PATENT NO. | : 7,546,808 B2 | Page 1 of 1 |
| APPLICATION NO. | : 11/473597 | |
| DATED | : June 16, 2009 | |
| INVENTOR(S) | : Gregory J. Saxton et al. | |

It is certified that error appears in the above-identified patent and that said Letters Patent is hereby corrected as shown below:

Column 9, line 10, should read --I-shaped-- instead of "1-shaped"

Column 9, line 40, should read --upright U shaped-- instead of "upright. U shaped"

Column 11, lines 66-67, should read --center beam; and-- instead of "center and"

Signed and Sealed this
Twelfth Day of April, 2011

David J. Kappos
*Director of the United States Patent and Trademark Office*